US011724826B2

(12) United States Patent
Nicholson et al.

(10) Patent No.: US 11,724,826 B2
(45) Date of Patent: Aug. 15, 2023

(54) SPACECRAFT SERVICING DEVICES AND RELATED ASSEMBLIES, SYSTEMS, AND METHODS

(71) Applicant: Northrop Grumman Systems Corporation, Falls Church, VA (US)

(72) Inventors: James Garret Nicholson, Broadlands, VA (US); Thomas Fred Meyer, Point of Rocks, MD (US); Daniel Guadagnoli, Aldie, VA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 17/476,303

(22) Filed: Sep. 15, 2021

(65) Prior Publication Data

US 2022/0002004 A1 Jan. 6, 2022

Related U.S. Application Data

(63) Continuation of application No. 16/041,701, filed on Jul. 20, 2018, now Pat. No. 11,124,318.

(60) Provisional application No. 62/535,747, filed on Jul. 21, 2017.

(51) Int. Cl.
*B64G 1/10* (2006.01)
*B64G 1/00* (2006.01)
*B64G 1/40* (2006.01)
*B64G 1/64* (2006.01)

(52) U.S. Cl.
CPC .......... *B64G 1/1078* (2013.01); *B64G 1/007* (2013.01); *B64G 1/40* (2013.01); *B64G 1/402* (2013.01); *B64G 1/646* (2013.01)

(58) Field of Classification Search
CPC ...... B64G 1/1078; B64G 1/222; B64G 1/402; B64G 1/646
See application file for complete search history.

(56) References Cited

U.S. PATENT DOCUMENTS

| 3,268,091 | A | 8/1966 | Melton |
| 3,508,723 | A | 4/1970 | Warren et al. |
| 3,662,973 | A | 5/1972 | Collins |
| 4,219,171 | A | 8/1980 | Rudmann |
| 4,298,178 | A | 11/1981 | Hujsak |
| 4,381,092 | A | 4/1983 | Barker |
| 4,391,423 | A | 7/1983 | Pruett et al. |
| 4,431,333 | A | 2/1984 | Chandler |

(Continued)

FOREIGN PATENT DOCUMENTS

| CN | 104071357 B | 4/2016 |
| EP | 2134606 A1 | 12/2009 |

(Continued)

OTHER PUBLICATIONS

Written Opinion of the International Search Authority for International Application No. PCT/US2018/043188 dated Oct. 17, 2018, 8 pages.

(Continued)

*Primary Examiner* — Tien Q Dinh
*Assistant Examiner* — William L Gmoser
(74) *Attorney, Agent, or Firm* — PCFB LLC

(57) ABSTRACT

Spacecraft servicing devices and related methods may include a propellant tank configured to store a propellant and to be placed into fluid communication with a portion of the target spacecraft.

20 Claims, 11 Drawing Sheets

(56) References Cited

U.S. PATENT DOCUMENTS

| | | |
|---|---|---|
| 4,449,684 A | 5/1984 | Hinds |
| 4,588,150 A | 5/1986 | Bock et al. |
| 4,657,211 A | 4/1987 | Fuldner et al. |
| 4,664,344 A | 5/1987 | Harwell et al. |
| 4,750,692 A | 6/1988 | Howard |
| 4,880,187 A | 11/1989 | Rourke et al. |
| 4,898,348 A | 2/1990 | Kahn |
| 4,955,559 A | 9/1990 | Kaminskas |
| 5,005,786 A | 4/1991 | Okamoto et al. |
| 5,040,749 A | 8/1991 | Johnson |
| 5,094,410 A | 3/1992 | Johnson |
| 5,104,070 A | 4/1992 | Johnson et al. |
| 5,125,601 A | 6/1992 | Monford, Jr. |
| 5,169,094 A | 12/1992 | Maute et al. |
| 5,299,764 A | 4/1994 | Scott |
| 5,349,532 A | 9/1994 | Tilley et al. |
| 5,364,046 A | 11/1994 | Dobbs et al. |
| 5,372,340 A | 12/1994 | Ihara et al. |
| 5,429,328 A | 7/1995 | Dobbs |
| 5,449,211 A | 9/1995 | Monford, Jr. |
| 5,490,075 A | 2/1996 | Howard et al. |
| 5,511,748 A | 4/1996 | Scott |
| 5,735,488 A | 4/1998 | Schneider |
| 5,803,407 A | 9/1998 | Scott |
| 5,806,802 A | 9/1998 | Scott |
| 5,813,632 A * | 9/1998 | Taylor .............. B64G 1/12 244/159.6 |
| 6,017,000 A | 1/2000 | Scott |
| 6,032,904 A | 3/2000 | Hosick et al. |
| 6,045,094 A | 4/2000 | Rivera |
| 6,082,678 A | 7/2000 | Maute |
| 6,264,145 B1 | 7/2001 | Maute |
| 6,272,751 B1 | 8/2001 | McMeekin |
| 6,275,751 B1 | 8/2001 | Stallard et al. |
| 6,296,207 B1 | 10/2001 | Tilley et al. |
| 6,299,107 B1 | 10/2001 | Kong et al. |
| 6,322,023 B1 | 11/2001 | Soranno et al. |
| 6,330,987 B1 | 12/2001 | Scott |
| 6,354,540 B1 | 3/2002 | Lewis et al. |
| 6,378,810 B1 | 4/2002 | Pham et al. |
| 6,484,973 B1 | 11/2002 | Scott |
| 6,523,784 B2 | 2/2003 | Steinsiek et al. |
| 6,565,043 B1 | 5/2003 | Wittmann |
| 6,669,148 B2 | 12/2003 | Anderman et al. |
| 6,742,745 B2 | 6/2004 | Tchoryk et al. |
| 6,789,767 B2 * | 9/2004 | Mueller ............ B64G 1/007 244/173.3 |
| 6,840,481 B1 | 1/2005 | Gurevich |
| 6,843,446 B2 | 1/2005 | Scott |
| 6,845,303 B1 | 1/2005 | Byler |
| 6,866,232 B1 | 3/2005 | Finney |
| 6,945,500 B2 | 9/2005 | Wingo |
| 6,969,030 B1 | 11/2005 | Jones et al. |
| 7,070,151 B2 | 7/2006 | D et al. |
| 7,104,505 B2 | 9/2006 | Tchoryk et al. |
| 7,114,682 B1 * | 10/2006 | Kistler ............... B64G 1/40 244/172.5 |
| 7,118,075 B2 | 10/2006 | Schubert |
| 7,163,179 B1 | 1/2007 | Taylor |
| 7,207,525 B2 | 4/2007 | Bischof et al. |
| 7,216,833 B2 | 5/2007 | D et al. |
| 7,216,834 B2 | 5/2007 | D et al. |
| 7,240,879 B1 | 7/2007 | Cepollina et al. |
| 7,293,743 B2 | 11/2007 | Cepollina et al. |
| 7,370,834 B2 | 5/2008 | Scott |
| 7,438,264 B2 | 10/2008 | Cepollina et al. |
| 7,461,818 B2 | 12/2008 | D et al. |
| 7,484,690 B2 | 2/2009 | D et al. |
| 7,513,459 B2 | 4/2009 | Cepollina et al. |
| 7,513,460 B2 | 4/2009 | Cepollina et al. |
| 7,559,508 B1 * | 7/2009 | Taylor ............... B64G 1/242 244/172.3 |
| 7,559,509 B1 * | 7/2009 | Kistler ............... B64G 1/446 244/172.3 |
| 7,575,199 B2 | 8/2009 | D et al. |
| 7,575,200 B2 | 8/2009 | Behrens et al. |
| 7,588,213 B2 | 9/2009 | D et al. |
| 7,611,096 B2 | 11/2009 | D et al. |
| 7,611,097 B2 | 11/2009 | D et al. |
| 7,624,950 B2 | 12/2009 | D et al. |
| 7,815,149 B1 | 10/2010 | Howard et al. |
| 7,823,837 B2 | 11/2010 | Behrens et al. |
| 7,828,249 B2 | 11/2010 | Ritter et al. |
| 7,857,261 B2 | 12/2010 | Tchoryk et al. |
| 7,861,974 B2 | 1/2011 | Hays et al. |
| 7,861,975 B2 | 1/2011 | Behrens et al. |
| 7,992,824 B2 | 8/2011 | Tchoryk et al. |
| 8,006,937 B1 | 8/2011 | Romano et al. |
| 8,006,938 B2 | 8/2011 | Behrens et al. |
| 8,016,242 B2 | 9/2011 | Baumann |
| 8,052,092 B2 | 11/2011 | Atmur et al. |
| 8,056,864 B2 | 11/2011 | Hays et al. |
| 8,074,935 B2 | 12/2011 | Gryniewski et al. |
| 8,181,911 B1 | 5/2012 | Gryniewski et al. |
| 8,196,870 B2 | 6/2012 | Gryniewski et al. |
| 8,205,838 B2 | 6/2012 | Moorer et al. |
| 8,226,046 B2 | 7/2012 | Poulos |
| 8,240,613 B2 | 8/2012 | Ritter et al. |
| 8,245,370 B2 | 8/2012 | Ritter et al. |
| 8,333,347 B2 | 12/2012 | Ritter et al. |
| 8,412,391 B2 | 4/2013 | Paluszek et al. |
| 8,448,904 B2 | 5/2013 | Gryniewski |
| 8,628,044 B2 | 1/2014 | Poulos |
| 8,899,527 B2 | 12/2014 | Allen et al. |
| 9,108,747 B2 | 8/2015 | Roberts et al. |
| 9,284,073 B2 | 3/2016 | Bigelow |
| 9,302,793 B2 | 4/2016 | Ghofranian et al. |
| 9,321,175 B2 | 4/2016 | Smith |
| 9,387,942 B2 | 7/2016 | Celerier |
| 9,399,295 B2 | 7/2016 | Roberts et al. |
| 9,434,485 B1 | 9/2016 | Lehocki |
| 9,463,883 B2 | 10/2016 | Bigelow |
| 9,527,607 B2 | 12/2016 | Celerier |
| 9,573,703 B2 | 2/2017 | Celerier |
| 9,663,251 B2 | 5/2017 | Munir |
| 9,809,327 B2 | 11/2017 | Rossettini et al. |
| 9,878,806 B2 | 1/2018 | Helmer et al. |
| 9,914,550 B1 | 3/2018 | Price et al. |
| 9,926,087 B2 | 3/2018 | Doubrere |
| 9,950,424 B2 | 4/2018 | Roberts et al. |
| 10,005,180 B2 | 6/2018 | Roberts et al. |
| 10,183,765 B2 | 1/2019 | Bibighaus |
| 10,232,959 B2 | 3/2019 | Moro |
| 10,407,184 B2 | 9/2019 | Mori et al. |
| 10,464,694 B1 | 11/2019 | Schwarz |
| 10,569,909 B2 | 2/2020 | Ho |
| 10,577,130 B1 | 3/2020 | Parish et al. |
| 11,358,739 B2 | 6/2022 | Faber |
| 2001/0017337 A1 | 8/2001 | Holemans |
| 2002/0063188 A1 | 5/2002 | Steinsiek et al. |
| 2003/0029969 A1 | 2/2003 | Turner |
| 2003/0192995 A1 | 10/2003 | Tchoryk et al. |
| 2004/0026571 A1 | 2/2004 | Scott |
| 2004/0245404 A1 | 12/2004 | Kerstein |
| 2004/0245407 A1 | 12/2004 | DAusilio et al. |
| 2005/0001102 A1 | 1/2005 | Schubert |
| 2005/0040282 A1 | 2/2005 | Wingo |
| 2005/0103940 A1 | 5/2005 | Bischof et al. |
| 2005/0258311 A1 | 11/2005 | Scott |
| 2006/0145023 A1 | 7/2006 | Babb et al. |
| 2006/0145024 A1 | 7/2006 | Kosmas |
| 2006/0151671 A1 | 7/2006 | Kosmas |
| 2007/0051854 A1 | 3/2007 | Behrens |
| 2007/0114334 A1 | 5/2007 | D et al. |
| 2007/0125910 A1 | 6/2007 | Cepollina |
| 2007/0164164 A1 | 7/2007 | Cepollina et al. |
| 2007/0228219 A1 | 10/2007 | Behrens et al. |
| 2007/0228220 A1 | 10/2007 | Behrens et al. |
| 2008/0060460 A1 | 3/2008 | Smith |
| 2008/0078886 A1 | 4/2008 | Foster |
| 2008/0121759 A1 | 5/2008 | Behrens et al. |
| 2008/0237400 A1 | 10/2008 | Gryniewski et al. |
| 2008/0265098 A1 | 10/2008 | Connelly et al. |

(56) References Cited

U.S. PATENT DOCUMENTS

| | | |
|---|---|---|
| 2009/0001221 A1 | 1/2009 | Collyer |
| 2009/0166476 A1 | 7/2009 | Termini |
| 2010/0038491 A1* | 2/2010 | Cepollina ............ B64G 1/242 244/172.5 |
| 2011/0121139 A1 | 5/2011 | Poulos |
| 2011/0180670 A1 | 7/2011 | D et al. |
| 2011/0192936 A1 | 8/2011 | Knirsch |
| 2012/0112009 A1 | 5/2012 | Gryniewski et al. |
| 2012/0286098 A1 | 11/2012 | Poulos |
| 2012/0292449 A1 | 11/2012 | Levin |
| 2012/0325972 A1 | 12/2012 | Gryniewski et al. |
| 2013/0103193 A1 | 4/2013 | Roberts et al. |
| 2013/0292516 A1 | 11/2013 | Celerier |
| 2013/0313369 A1 | 11/2013 | Celerier |
| 2014/0027577 A1 | 1/2014 | Darooka |
| 2014/0361123 A1 | 12/2014 | Celerier |
| 2014/0361124 A1 | 12/2014 | Celerier |
| 2015/0008288 A1 | 1/2015 | Bigelow |
| 2015/0008290 A1 | 1/2015 | Bigelow |
| 2015/0053823 A1 | 2/2015 | Bigelow |
| 2015/0097084 A1 | 4/2015 | Szabo et al. |
| 2015/0314893 A1 | 11/2015 | Rembala et al. |
| 2016/0039543 A1 | 2/2016 | Roberts et al. |
| 2016/0039544 A1 | 2/2016 | Roberts et al. |
| 2016/0176545 A1 | 6/2016 | Munir |
| 2016/0185471 A1 | 6/2016 | Blincow |
| 2016/0257435 A1 | 9/2016 | Coraboeuf et al. |
| 2017/0113818 A1 | 4/2017 | Mori et al. |
| 2017/0129627 A1 | 5/2017 | Moro et al. |
| 2017/0342943 A1 | 11/2017 | Watts |
| 2017/0349302 A1 | 12/2017 | Bibighaus |
| 2018/0029727 A1 | 2/2018 | Doubrere |
| 2018/0072436 A1 | 3/2018 | Ishikawa |
| 2018/0087683 A1 | 3/2018 | Raven et al. |
| 2018/0118377 A1 | 5/2018 | Garber |
| 2018/0148197 A1 | 5/2018 | Halsband et al. |
| 2018/0186476 A1 | 7/2018 | Poncet et al. |
| 2018/0251240 A1 | 9/2018 | Reitman et al. |
| 2018/0251242 A1 | 9/2018 | Gorakavi et al. |
| 2018/0297722 A1 | 10/2018 | Agathon-Burton et al. |
| 2018/0297723 A1 | 10/2018 | Sorensen et al. |
| 2019/0023420 A1 | 1/2019 | Nicholson et al. |
| 2019/0023421 A1 | 1/2019 | Nicholson et al. |
| 2019/0023422 A1 | 1/2019 | Nicholson et al. |
| 2019/0135456 A1 | 5/2019 | Wingo |
| 2019/0300207 A1 | 10/2019 | Izumisawa |

FOREIGN PATENT DOCUMENTS

| | | |
|---|---|---|
| EP | 2522577 A1 | 11/2012 |
| EP | 3083406 B1 | 2/2017 |
| EP | 3156335 A1 | 4/2017 |
| EP | 3186151 A1 | 7/2017 |
| EP | 3248737 B1 | 12/2018 |
| JP | 2013-121126 A | 6/2013 |
| JP | 2015174647 A | 10/2015 |
| KR | 10-1808553 B1 | 12/2017 |
| RU | 2586437 C1 | 6/2016 |
| RU | 2601522 C1 | 11/2016 |
| WO | 2008/109993 A1 | 9/2008 |
| WO | 2014/024199 A1 | 2/2014 |
| WO | 2015/190527 A1 | 12/2015 |
| WO | 2016/030890 A1 | 3/2016 |
| WO | 2016/181079 A1 | 11/2016 |

OTHER PUBLICATIONS

Written Opinion of the International Search Authority for International Application No. PCT/US2018/043182 dated Sep. 24, 2018, 7 pages.

Written Opinion of the International Search Authority for International Application No. PCT/US2018/043180 dated Oct. 12, 2018, 8 pages.

International Search Report for International Application No. PCT/US2018/043188 dated Oct. 17, 2018, 5 pages.

International Search Report for International Application No. PCT/US2018/043182 dated Sep. 24, 2018, 5 pages.

International Search Report for International Application No. PCT/US2018/043180 dated Oct. 12, 2018, 5 pages.

Weise et al., "An Intelligent Builging Blocks Concept for On-Orbit-Satellite Servcing", Turin, Italy, 4-6 September 2-12, 8 pages.

Sellmaier et al., "On-Orbit Servicing Missions: Challenges and Solutions for Spacecraft Operations", SpaceOps 2010 Conference, AIAA 2010-2159, 2010.

Reintsema et al., "DEOS—The In-Flight Technology Demonstration of German'srobotics Approach To Dispose Malfunctioned Satellites", 2010, 8 pages.

Mukherjee, "Robotic Assembly of Space Assets; Architectures and Technologies" Future In-Space Operations (FISO) Teleconference, Jun. 27, 2018, 2018 NASA Jet Propulsion Laboratory California Institute of Technology, 41 pages.

Medina et al., "Towards a standardized grasping and refuelling on-orbit servicing for geo spacecraft", Acta Astronautica, vol. 134, 2017, pp. 1-10.

iBOSS—a modular approach towards enhanced future space systems and flexibility, http://www.iboss-satellites.com/iboss/, http://exchange.ciros-engineering.com/download/public/iBOSS_IAC-2017.wmv.

FEHSE "Automated Rendezvous and Docking of Spacecraft", 15 pages, Cambridge University Press 2003.

DLR, iBOSS—intelligent Building Blocks for On-Orbit Satellite Servicing and Assembly; German Aerospace Center (DLR)Space Administration, 2017, 2 pages.

* cited by examiner

SPACECRAFT SERVICING DEVICES AND RELATED ASSEMBLIES, SYSTEMS, AND METHODS

CROSS-REFERENCE TO RELATED APPLICATION

This application is a continuation of U.S. patent application Ser. No. 16/041,701, filed Jul. 20, 2018, which application claims the benefit under 35 U.S.C. § 119(e) of U.S. Provisional Patent Application Ser. No. 62/535,747 filed Jul. 21, 2017, the disclosure of each of which is hereby incorporated herein in its entirety by this reference.

TECHNICAL FIELD

Embodiments of the present disclosure generally relate to servicing devices for spacecraft (e.g., satellites). In particular, embodiments of the present disclosure relate to servicing devices including one or more detachable servicing devices (e.g., pods or modules) and related devices, systems, assemblies, and methods.

BACKGROUND

Thousands of spacecraft orbit the Earth for performing various functions including, for example, telecommunication, GPS navigation, weather forecasting, and mapping. Like all machines, spacecraft periodically require servicing to extend their functioning life span. Servicing may include, for example, component repair, refueling, orbit raising, station-keeping, momentum balancing, or other maintenance. To accomplish this, a servicing spacecraft may be sent into orbit to dock with a client spacecraft requiring maintenance, and subsequent to docking, perform life extending maintenance on the client spacecraft. Without life extension maintenance, these spacecraft may fall out of service, and replacement is generally extraordinarily expensive and can have a lead time of years.

Various patents and publications have considered such spacecraft servicing and related features and issues, including U.S. Pat. Nos. 3,508,723, 4,219,171, 4,391,423, 4,588,150, 4,664,344, 4,898,348, 5,005,786, 5,040,749, 5,094,410, 5,299,764, 5,364,046, 5,372,340, 5,490,075, 5,511,748, 5,735,488, 5,803,407, 5,806,802, 6,017,000, 6,299,107, 6,330,987, 6,484,973, 6,523,784, 6,742,745, 6,843,446, 6,945,500, 6,969,030, 7,070,151, 7,104,505, 7,207,525, 7,216,833, 7,216,834, 7,240,879, 7,293,743, 7,370,834, 7,438,264, 7,461,818, 7,484,690, 7,513,459, 7,513,460, 7,575,199, 7,588,213, 7,611,096, 7,611,097, 7,624,950, 7,815,149, 7,823,837, 7,828,249, 7,857,261, 7,861,974, 7,861,975, 7,992,824, 8,006,937, 8,006,938, 8,016,242, 8,056,864, 8,074,935, 8,181,911, 8,196,870, 8,205,838, 8,240,613, 8,245,370, 8,333,347, 8,412,391, 8,448,904, 8,899,527, 9,108,747, 9,302,793, 9,321,175, and 9,399,295; U.S. Patent Pub. Nos. 2004/0026571, 2006/0145024, 2006/0151671, 2007/0228220, 2009/0001221, 2012/0112009, 2012/0325972, 2013/0103193, 2015/0008290, 2015/0314893, 2016/0039543, and 2016/0039544; European Patent Nos. EP 0541052, 0741655 B1, 0741655 B2, and 1654159; PCT Pub. Nos. 2005/110847, 2005/118394, 2014/024199, and 2016/030890; Japan Patent No. JPH01282098; *Automated Rendezvous and Docking of Spacecraft*, Fehse, Wigbert, Cambridge University Press (2003); *On-Orbit Servicing Missions: Challenges and Solutions for Spacecraft Operations*, Sellmaier, F., et al., SpaceOps 2010 Conference, AIAA 2010-2159 (2010); and *Towards a Standardized Grasping and Refueling On-Orbit Servicing for Geo Spacecraft*, Medina, Alberto, et al., Acta Astronautica 134 1-10 (2017); *DEOS—The In-Flight Technology Demonstration of German's Robotics Approach to Dispose Malfunctioned Satellites*, Reintsema, D., et al., the disclosure of each of which is hereby incorporated herein in its entirety by this reference.

However, reliable and robust servicing spacecraft that provide a variety of servicing options for spacecraft may be cost prohibitive. On the other hand, lower cost options may not be able to provide a variety of servicing options and reliable and robust servicing features necessary for many applications.

BRIEF SUMMARY

Embodiments of the present disclosure include a spacecraft servicing device including a body configured to be deployed from a host spacecraft at a location adjacent a target spacecraft and a propellant tank coupled to the body. The propellant tank is configured to store at least one propellant and to be in communication with a portion of a propulsion device of the target spacecraft. The spacecraft servicing device is configured, during at least one servicing operation and while being coupled to the target spacecraft, to supply at least a portion of the at least one propellant from the propellant tank to the propulsion device of the target spacecraft while bypassing any fuel storage of the target spacecraft.

Embodiments of the present disclosure further include a spacecraft servicing device including a body configured to be deployed from a host spacecraft at a location adjacent a target spacecraft, where the host spacecraft houses a plurality of spacecraft servicing devices, and a propellant tank coupled to the body. The propellant tank is configured to store at least one propellant and to be placed into fluid communication with a portion of the target spacecraft. The propellant tank is configured to supply at least a portion of the at least one propellant to the target spacecraft during at least one servicing operation on the target spacecraft while being coupled to the target spacecraft.

Embodiments of the present disclosure further include a spacecraft servicing pod having a body configured to be deployed from a host spacecraft, a thruster assembly coupled to the body and configured to alter at least one momentum of the target spacecraft after being coupled to the target spacecraft, and a communication device configured to receive data relating to the at least one momentum of the target spacecraft from a location remote from the spacecraft servicing device.

Embodiments of the present disclosure further include a spacecraft servicing pod having a body configured to be deployed from a host spacecraft, a thruster assembly configured to alter at least one of an orbit or a velocity of the target spacecraft after being coupled to the target spacecraft, and a communication device configured to receive data relating to the target spacecraft from a location remote from the spacecraft servicing device.

Embodiments of the present disclosure further include a spacecraft servicing pod having a body configured to be deployed from a host spacecraft and to be coupled to a target spacecraft and a communication device configured to receive data relating to the target spacecraft. The communication device comprises a flexible frequency transceiver configured to selectively alter a frequency of communication of the flexible frequency transceiver. The flexible frequency transceiver is configured to be in communication with a ground station associated with the target spacecraft and to alter the frequency of communication of the flexible frequency transceiver to match a frequency of communication of the ground station.

Embodiments of the present disclosure further include a method of supplying a propellant to a target spacecraft with a spacecraft servicing device. The method includes transferring the spacecraft servicing device to the target spacecraft with a host spacecraft; supplying at least a portion of a propellant from a propellant tank of a spacecraft servicing device to a propulsion system of the target spacecraft via fluid channels of the propulsion system; and while supplying the propellant from the propellant tank to the propulsion system of the target spacecraft, bypassing any fuel storage volumes of the propulsion system in fluid communication with the fluid channels of the propulsion system.

Embodiments of the present disclosure further include a method of servicing a spacecraft. The method includes transferring a pod of a spacecraft servicing device to the spacecraft with the spacecraft servicing device, coupling the pod to the spacecraft while the pod is in contact with the spacecraft servicing device, and after being coupled to the spacecraft, altering at least one of an orbit or a velocity of the spacecraft with a thruster assembly of the spacecraft servicing device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

Figure 1A:
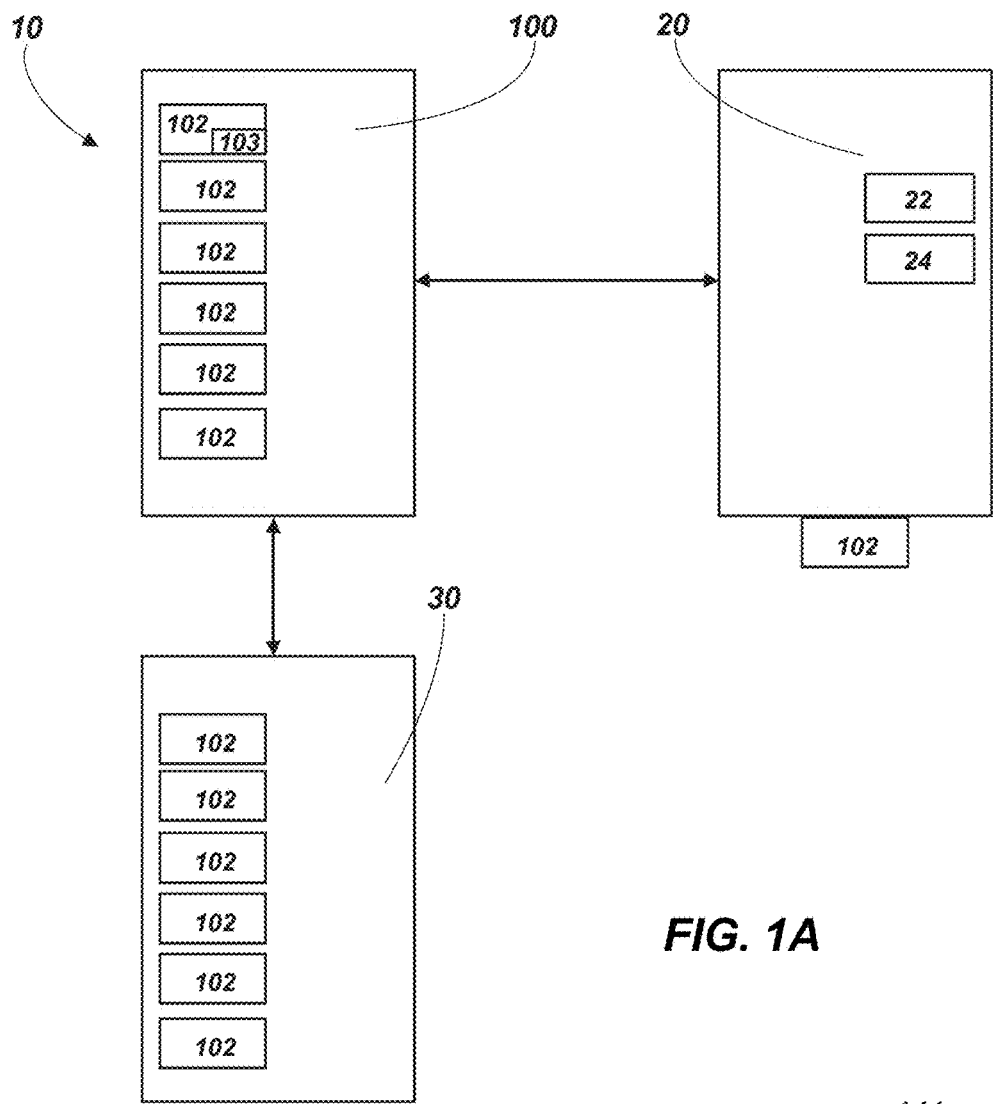
FIG. 1A is a simplified schematic view of a spacecraft servicing system and a target spacecraft to be serviced according to one or more embodiments of the present disclosure.

The illustrations presented herein are not meant to be actual views of any particular device, assembly, system, or component thereof, but are merely idealized representations employed to describe illustrative embodiments. The drawings are not necessarily to scale.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

Embodiments of the disclosure relate generally to spacecraft (e.g., satellite or other vehicle) servicing devices for providing life extending service to spacecraft (otherwise referred to as "clients"). The spacecraft servicing systems, assemblies, or devices (e.g., spacecraft, vehicles) may include one or more deployable spacecraft servicing devices, pods, or modules (e.g., a mission extension pod (MEP)) that are initially attached to the spacecraft servicing device (e.g., a MEP mother ship (MEPM) or mission robotic vehicle (MRV)). The spacecraft servicing device may then transfer the pods to/from the client spacecraft. A spacecraft servicing resupply device may provide additional pods for the spacecraft servicing device.

The pods (e.g., five pods, six pods, ten pods, fifteen pods, or more provided by the mother ship) may be provided to the target spacecraft (e.g., may be individually deployed and/or attached to the spacecraft) in order to supply life extending service to spacecraft including, for example, component repair, refueling, orbit raising or other modifications (e.g., deorbit), relocation, inclination pull-down, station-keeping, momentum balancing, momentum adjustment, replenishment of supplies, providing new supplies or componentry, and/or other maintenance. In some embodiments, the pods may be utilized to adjust the velocity, positioning, and/or orbit of a spacecraft including station-keeping, inclination pull-down, orbit relocation, and disposal. In some embodiments the pods may be used to manage the momentum and provide attitude control of a spacecraft. In some embodiments, the pods may supply replacement or additional components. For example, the pods may be equipped with components (e.g., flight control components, avionic components, such as a reaction wheel, motor components, communication components, power system components, sensor components, optic components, thermal control components, telemetry components, combinations thereof, etc.) that may be utilized to replace failing componentry, supplement existing componentry, and/or add componentry and selected functioning and features to the spacecraft. By way of further example, the pods may include telemetric features, such as, for example, an optical device that measures the position of stars using photocells or a camera (e.g., a star tracker). Such a device or devices may be supplied on the pod to monitor and/or modify characteristics of travel of the spacecraft (e.g., attitude).

In some embodiments, the spacecraft servicing device may deploy and attach one or more of the pods to the spacecraft in need of service using robotic spacecraft servicing devices (e.g., one or more robotic arms capable of one or more degrees of freedom with one or more end effectors for various tasks) for in-orbit satellite servicing. For example, the spacecraft servicing device may deploy and attach one or more of the pods to a portion of the spacecraft (e.g., a separation ring, an engine, external appendage, or any other suitable mechanical attachment or coupling structure, or any other suitable mechanical attachment or coupling structure). In some embodiments, the spacecraft servicing device itself may perform some servicing tasks before, during, and/or after deployment of the pod to the spacecraft.

The spacecraft servicing device travels in space to and between spacecraft and may install a mission extension pod onto spacecraft in need of servicing. In some embodiments, the spacecraft servicing device may attach the pod to the spacecraft and leave the pod attached for servicing. For example, the pod may be permanently attached to the spacecraft and essentially become another component of the spacecraft, which may or may not be in communication with the existing system of the spacecraft. In such embodiments, the pod may be configured to provide service over a selected amount of time (e.g., for short-term servicing and/or long-term servicing, such as, over minutes, weeks, months, years, or combinations thereof)). In some embodiments, the spacecraft servicing device or another similar device, may remove, replenish (e.g., refuel), and/or replace the pod after a selected amount of servicing. For example, a portion of the servicing systems (e.g., the spacecraft servicing device or another portion, such as the resupply device discussed below) may revisit the pod to resupply (e.g., refill, replenish, supplement, etc.) the pod with one or more consumables (e.g., fuel, gas, componentry, etc.). In some embodiments, the spacecraft servicing device may attach an additional device (e.g., tank) with such consumables to the pod. In some embodiments, the spacecraft servicing device may detach the pod from a spacecraft, replenish and/or refurbish the pod reinstall it (e.g., reuse it) on the same or another spacecraft.

Once attached to the spacecraft, the pod may be activated and provide, for example, orbit maintenance by altering the velocity (e.g., by providing a $\Delta V$) including, for example, altering direction of the spacecraft (e.g., by altering the orbit, position, or another orientation of the spacecraft). By providing a change in velocity to the combined mass of the spacecraft and the mission extension pod, in the correct time and direction, the mission extension pod may extend the spacecraft's in-orbit life, for example, by replacing (e.g., completely replacing the propulsive functions of the spacecraft or by reducing the rate of spacecraft fuel consumption needed to maintain the desired velocity, position, and orbit. The mission extension pod may provide such a change in velocity to the spacecraft according to a schedule that is provided from data relating to the spacecraft. In some embodiments, data needed for the maneuver schedule may be pre-programmed into the mission extension pod. In some embodiments, such schedule and other data may be transmitted to the mission extension pod after the pod has been launched and/or coupled to the spacecraft. In some embodiments, the pod may be configured to only provide a thrust force (e.g., a relatively low-magnitude thrust force) to the spacecraft without otherwise interacting with other systems or attributes of the spacecraft. In some embodiments, the pod may be configured to provide a torque about the spacecraft so that the spacecraft is able to adjust its momentum. In other embodiments, the pod may provide other services (e.g., as discussed herein) and/or may be in at least partial communication with one or more systems or subsystems of the spacecraft.

In some embodiments, a satellite servicing system may be configured to supply or resupply the spacecraft servicing device with pods, for example, once the number of pods on the spacecraft servicing device have been decreased or depleted with a mission extension pod supply or resupply device (MEPR). For example, once the supply of mission extension pods is decreased or depleted, the spacecraft servicing device may acquire a new supply of pods (e.g., five pods, six pods, ten pods, fifteen pods, or more) to continue offering life extension services to potential spacecraft.

The mission extension pod resupply device (e.g., a spacecraft) may carry a number (e.g., 2, 3, 4, 5, or more pods) in order to rendezvous with the spacecraft servicing device and to supply the pods to the device. For example, the pod resupply device with the mission extension pods may be placed in a geosynchronous orbit (GEO) or other orbits while the spacecraft servicing device rendezvous to its location. Once the spacecraft servicing device approaches the mission extension pod resupply device, one or more devices on the spacecraft servicing device and/or the pod resupply device (e.g., robotic arms of the spacecraft servicing device) may relocate the mission extension pods from the mission extension pod resupply device to the spacecraft servicing device. In other embodiments, the pod resupply device may be configured to travel to the spacecraft servicing device. In other embodiments, one or more devices on the pod resupply device may be configured to supply the pods to the spacecraft servicing device or the pod resupply device and the spacecraft servicing device may be configured to couple together or otherwise be placed in physical communication in order to transfer one or more of the pods.

In some embodiments, the mission extension pod resupply device may provide additional supplies to or servicing of the spacecraft servicing device. For example, the pod resupply device may provide additional propellant for the spacecraft servicing device maneuvering as needed. In some embodiments, the pod resupply device may transfer propellant to the spacecraft servicing device by a refueling operation and/or by transferring tanks loaded with propellant from the resupply device to the servicing device (e.g., with one or more robotic arms on one or more of the spacecraft servicing device and the resupply device).

In some embodiments, one or more of the spacecraft servicing device and the spacecraft for mission extension pod deliveries may be conducted with and/or comprise an Evolved Expendable Launch Vehicle (EELV) Secondary Payload Adaptor (ESPA or ESPA ring) class spacecraft, for example, such as those developed by Northrup Grumman, of Falls Church, Va., known as ESPAStar, or any other suitable type device, spacecraft, or launch vehicle that may be possible in an appropriate geosynchronous orbit or another orbits.

In some embodiments, one or more devices or components of the satellite servicing system may be disposed of, for example, by transporting them from a select geosynchronous orbit to a geosynchronous graveyard orbit (e.g., for the spacecraft servicing device and/or mission extension pod resupply device) or by abandoning in place on the spacecraft (e.g., for the mission extension pods).

FIG. 1A depicts a simplified schematic view of a spacecraft servicing system 10 where at least a portion of the spacecraft servicing system 10 may be operated to approach, capture, dock to, and/or service a device (e.g., another vehicle or spacecraft 20). However, in some embodiments, a spacecraft servicing device 100 may be configured to approach the spacecraft 20 and to transfer one or more modules or pods 102 (e.g., mission extension pods 102) to the spacecraft 20, as discussed below in greater detail.

Such a spacecraft 20 may be in low earth orbit, medium earth orbit, geosynchronous orbit, beyond geosynchronous orbit, or in another orbit around a body such as Earth. Spacecraft 20 may include components, such as, for example, an engine, a separation ring, and any other type of feature known and/or implemented in spacecraft fields (e.g., a propulsion device or system 22, a fuel tank 24, etc.), which can be used to provide for mechanical coupling of the pod 102 to the spacecraft 20. For example, the engine may be a liquid apogee engine, solid fuel motor, thruster, or other type of engine or motor. The engine may be positioned on the zenith deck of the spacecraft 20, which, in the case of a spacecraft orbiting the Earth, is a deck of the spacecraft substantially positioned opposite the Earth.

As shown in FIG. 1A, the spacecraft servicing device 100 may be a separate spacecraft designed to approach and service the spacecraft 20. Spacecraft servicing device 100 may facilitate providing services to the spacecraft 20 including station-keeping, orbital raising, momentum adjustment (e.g., unloading momentum about one or more axes), attitude control, relocation, deorbit, refueling, repair, inclination pull-down, or other services that may be provided on-orbit. The spacecraft servicing device 100 includes one or more deployable pods or modules 102 that are initially attached to the spacecraft servicing device 100. The pods 102 may be provided to spacecraft 20 (e.g., may be deployed and/or attached to the spacecraft) and may include servicing componentry 103 (e.g., only shown in one instant of the pods 102 for clarity) in order to service (e.g., to supply life extending service to spacecraft 20) including, for example, component repair, replacement, and/or addition, refueling, orbit raising, station-keeping, momentum balancing, replenishment of supplies, providing new supplies, and/or other maintenance.

As depicted in FIG. 1A, at least one pod may be provided from the spacecraft servicing device 100 and coupled to the spacecraft 20 (e.g., proximate or along an axis extending through the center of mass of the spacecraft) in order to supply such servicing.

In some embodiments, the spacecraft servicing system 10 may include a mission extension pod supply or resupply device 30 configured to supply or resupply the spacecraft servicing device 100 with pods 102, for example, once the number of pods 102 on the spacecraft servicing device 100 have been decreased or depleted. For example, once the supply of mission extension pods 102 is decreased or depleted, the spacecraft servicing device 100 may acquire a new supply of pods 102 (e.g., five pods, ten pods, fifteen pods, or more) to continue offering life extension services to potential spacecraft 20. In some embodiments, the pod resupply device 30 with the mission extension pods 102 may be placed in a geosynchronous orbit (GEO) while spacecraft servicing device 100 rendezvous to its location. Once the spacecraft servicing device 100 approaches mission extension pod resupply device 30, one or more devices on one or both of the spacecraft servicing device 100 and the pod resupply device 30 (e.g., robotic arms on the spacecraft servicing device 100 discussed below) may relocate one or more of the mission extension pods 102 from the mission extension pod resupply device 30 to the spacecraft servicing device 100. In some embodiments, one of the pod resupply device 30 and the spacecraft servicing device 100 may be configured to retain the other in order to relocate the mission extension pods 102. For example, the spacecraft servicing device 100 may approach the pod resupply device 30 and dock or otherwise engage with the resupply device 30. Once docked, the spacecraft servicing device 100 may transfer one or more of pods 102 (e.g., using the robotic arms) from the resupply device 30 to the spacecraft servicing device 100. The spacecraft servicing device 100 may then undock and deploy more pods to other devices. In other embodiments, the pod resupply device 30 may be configured to travel to the spacecraft servicing device 100. In other embodiments, one or more devices on the pod resupply device 30 (e.g., robotic arms) may be configured to supply the pods 102 to the spacecraft servicing device 100.

In order to position the pods 102 on the target spacecraft 20, the spacecraft servicing device 100 may position and store the pods 102 within reach of one or more mechanisms 122 (FIG. 2A) configured to the position, move, and/or install the pods. As discussed below, the mechanism may comprise one or more robotic arms 122 and/or another type of deployment device (e.g., coupling mechanism), such as an extendable and/or expandable boom, similar to deployment device 160 discussed below, that is configured to secure the spacecraft servicing device 100 to the pods 102 as discussed below. In some embodiments, the one or more robotic arms 122 may comprise one or more degrees of freedom enabling movement of the arm 122 along one or more axes of movement. For example, the arm 122 may comprise an extendable boom in some embodiments (e.g., similar to the deployment device 160 discussed below) that is translatable along one axis of movement or a device being capable of rotating and/or translating along one or more axes of movement. If reach is insufficient with a first single mechanism (e.g., an arm), optionally, a second mechanism (e.g., a second arm or some other device capable of moving or reorienting the pods 102) may be implemented to move the pods 102 within reach of the first mechanism used to install pod 102 onto the target spacecraft 20.

For example, the pods 102 may be positioned on or in structure of the spacecraft servicing device 100 within reach of the robotic arm(s). If reach is insufficient with a single arm, an optional second arm or other device is used to move pod 102 within reach of the other robotic arm used to install pod 102 onto the target spacecraft 20.

In some embodiments, the pods 102 may be positioned on one or more separable structures within reach of the robotic arm(s). Once the pods 102 are depleted (e.g., entirely depleted) the separable structures may be detached from the spacecraft servicing device 100. In such an embodiment, the fuel consumption of the spacecraft servicing device 100 may be reduced for later rendezvous and servicing activities.

In some embodiments, the pods 102 may be carried on another device (e.g., a pod resupply device 30 that launches with the spacecraft servicing device 100) and then the pods 102 may be transferred to the spacecraft servicing device 100 after launch. For example, the spacecraft servicing device 100 may be used to tug the pod resupply device 30 to a geosynchronous orbit or other orbits and then the vehicles may separate. The spacecraft servicing device 100 may dock with the pod resupply device 30 using a docking mechanism on the spacecraft servicing device 100 and complementary structure or devices on the pod resupply device 30. Once docked, robotic arm(s) on the spacecraft servicing device 100 may transfer one or more pods 102 from the pod resupply device 30 to stow locations on the spacecraft servicing device 100. In this manner, the total mass of the spacecraft servicing device 100 is minimized for its recurring transits and rendezvous with target spacecraft 20 resulting in minimized fuel use over the life cycle of the mission. The pod resupply device 30 may be cooperatively controlled to place it in desired orbit locations for the spacecraft servicing device 100 to return and resupply the pods 102.

As discussed above, a portion of the system 10 (e.g., the pods 102, the spacecraft servicing device 100, and/or the resupply device 30) may couple with another portion of the system 10 or to an external device (e.g., the pods 102, the spacecraft servicing device 100, and/or the spacecraft 20) to supply (e.g., refill, replenish, supplement, etc.) the device with one or more consumables (e.g., fuel, gas, componentry, etc.). In some embodiments, such supplies may be supplied in an additional external tank attached to the device and/or may be supplied through a replacement (e.g., refueling) proceeding using existing components.

Spacecraft will generally use a propellant (e.g., xenon, hydrazine) to maintain positioning and pointing during mission life. Depletion of this propellant generally results in end of mission life. In some embodiments, the spacecraft servicing device 100, the pods 102, and/or the resupply device 30 (a "fuel supply device") may provide additional propellant to another portion of the system 10 or to an external device (e.g., the pods 102, the spacecraft servicing device 100, and/or the spacecraft 20 (a "target device")). In other embodiments, the fuel supply device may act to supply other fuels or fluids, such as, for example, a tank of high pressure xenon, hydrazine, helium, nitrogen tetroxide (NTO), a green propellant, combinations thereof, or any other suitable fuel. In some embodiments, the selection of propellant or fuel may be based on the application of the pod 102 (e.g., based on the configuration of the spacecraft 20).

Figure 1B:
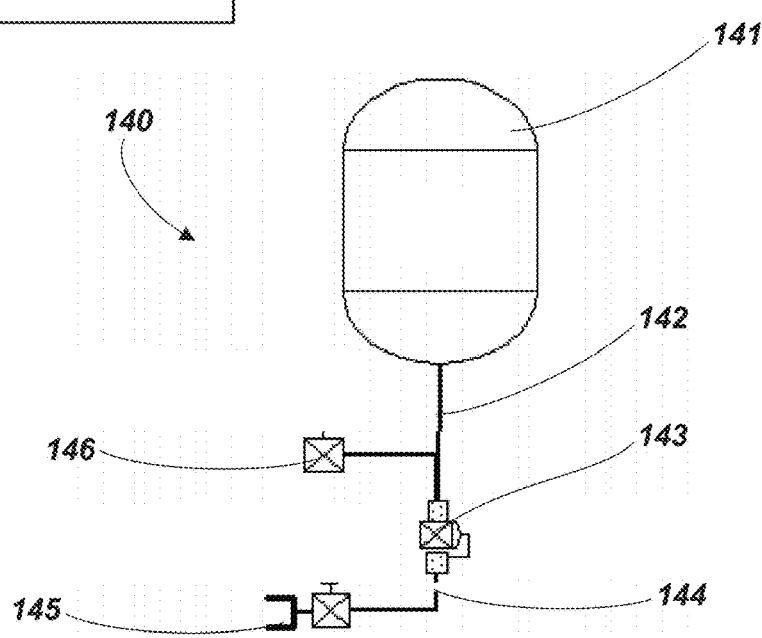
FIG. 1B depicts an embodiment of a fuel tank supply device that may be implemented on one or more devices of the spacecraft servicing system of FIG. 1A.

FIG. 1B depicts an embodiment of such a fuel tank supply device 140 of the fuel supply device that may be implemented on one or more devices of the system 10 (FIG. 1A). As shown in FIG. 1B, in some embodiments, tubing 142 on the fuel tank supply device 140 may supply the fuel (e.g., high pressure xenon) in a tank 141 to a regulator 143 (e.g., a mechanical and/or electrical regulator). The regulator 143 may control (e.g., reduce) the pressure to a level that can be used by the system of the target device. Additional tubing 144 may be positioned downstream of the regulator 143 and may be connected to a mating adapter 145. The mating adapter 145 may connect to a coupling (e.g., a service port valve) of the target device that is in communication with the fuel of the target device. In some embodiments, such mating adapters 145 of the fuel supply device may include connection fittings (e.g., quick disconnect fittings, cooperative service valves, and/or a simple mechanical service valve) for coupling with a tank of the target device. For example, such a mating adapter 145 may comprise a valve (e.g., a rotating valve or nut) that opens and closes the flow path. The mating adapter 145 may include a coupling member (e.g., a female coupling member) that may be attached to a coupling (e.g., valve port) of the target device (e.g., a complementary male coupling member).

In some embodiments, the mating adapter 145 may be prepared by removing a cap or plug and the target device may be prepared by removing any structure (e.g., blankets and/or a cap or plug) over the coupling of the target device. Once prepared, the mating adapter 145 is mechanically attached to the service valve of the target device and one or more valves (e.g., on the target device and the fuel tank supply device 140) may be opened and the pressure monitored (e.g., the pressure detecting in the systems of the target device). Decrease in this pressure may indicate that there is an incorrect mating between the adapter of the fuel tank supply device 140 and the mating adapter 145 of the fuel tank supply device 140. Once the connection has been verified, the valve upstream of the mating adapter 145 may be moved to the open position and the tank 141 will supply fuel to the tank of the target device. In embodiments where the tank 141 of the fuel tank supply device 140 lacks pressure telemetry, systems of the target device may be utilized to monitor fuel use to determine if the tank 141 of the fuel tank supply device 140 is reaching depletion. As the tank 141 of the fuel tank supply device 140 nears depletion, the tank 141 of the fuel tank supply device 140 may be removed from communication by closing the valve upstream of the mating adapter 145 and the target device and a new tank may be connected to the target device (e.g., on the same fuel tank supply device 140 by replacing a previous tank or on a different fuel tank supply device, which may enable a previous tank to remain connected). Such a fuel tank supply device 140 may include a service valve 146 to initially pressurize the system, mechanical supports for equipment and attachment to the target device, grappling appendages, and/or passive thermal control.

Figure 2A:
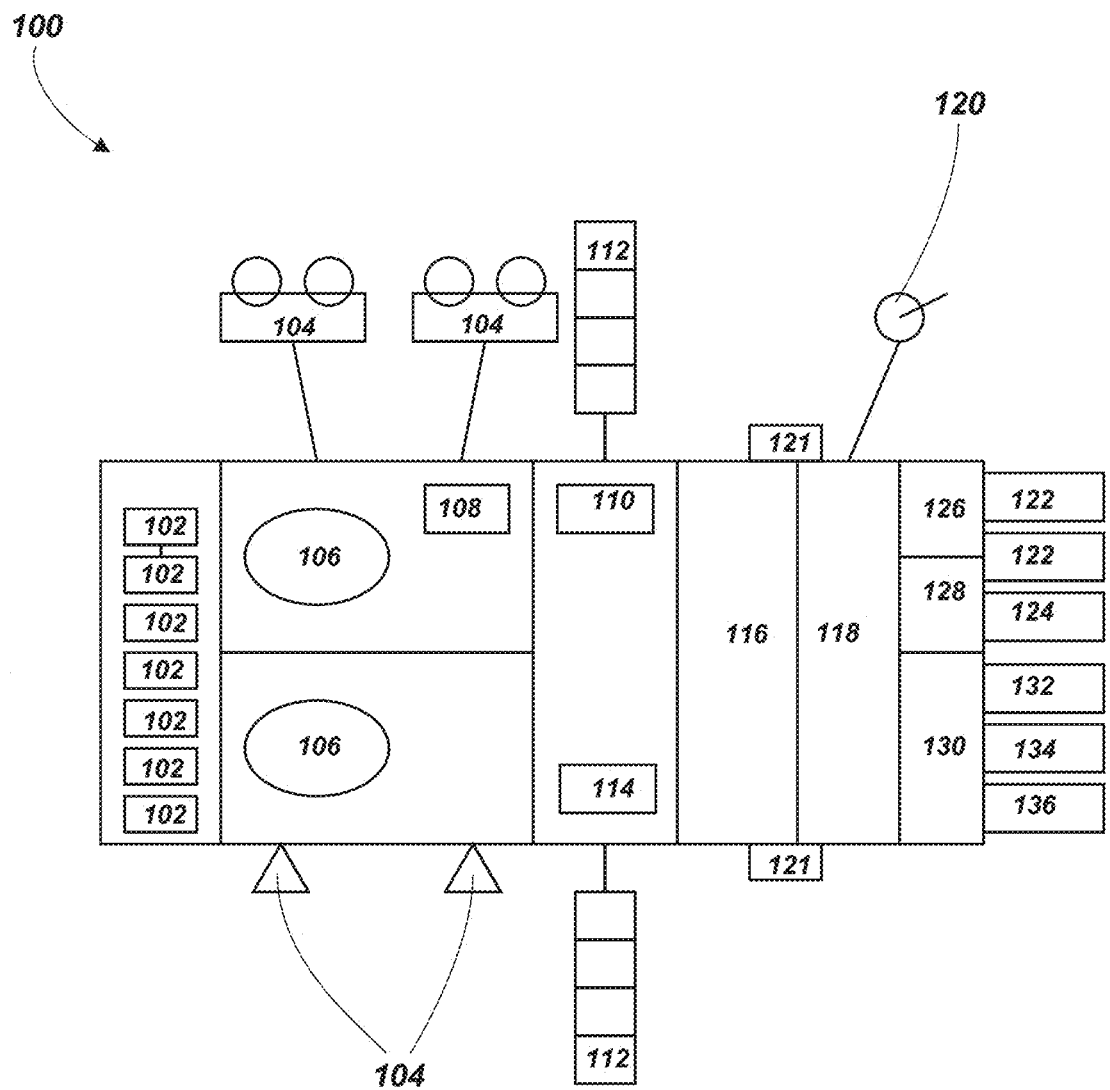
FIG. 2A is a simplified schematic view of a spacecraft servicing device according to one or more embodiments of the present disclosure.

FIG. 2A depicts a simplified schematic view of an embodiment of a spacecraft servicing device 100 (e.g., the spacecraft servicing device 100 of FIG. 1A). As shown in FIG. 2A, the spacecraft servicing device 100 includes the one or more deployable pods or modules 102 that are initially attached to the spacecraft servicing device 100. The spacecraft servicing device 100 may be a satellite or other spacecraft situated in orbit around a body.

In order to deliver, attach, and/or retrieve the pods 102 to another spacecraft, the spacecraft servicing device 100 may include a chemical or another type of reaction engine and/or may include an electrically powered propulsion system. For example, the spacecraft servicing device 100 may include one or more thrusters 104, a power system including chemical and/or electric propulsion sources (e.g., fuel tanks 106 housing a xenon propellant for an ion thruster and/or a hydrazine propellant), and power processing units 108. The propulsion system of the spacecraft servicing device 100 (e.g., including the thrusters 104) may enable the spacecraft servicing device 100 to move in one or more axes of movement (e.g., three axis of translation and three axes of rotation for a total of six axes of movement). The spacecraft servicing device 100 may include solar arrays 110 (e.g., directable solar arrays), batteries 112, power regulation electronics, such as, a power distribution assembly 114), control subsystems 116 (e.g., command and data handling, thermal controls, guidance, navigation, and control), communication subsystems 118 (e.g., radio frequency (RF) communications with associated antenna 120), and accessory tools 121 (e.g., service componentry and/or end effector for the robotic arm(s) discussed below). Such components may enable the spacecraft servicing device 100 to maneuver to a location proximate another spacecraft to be serviced.

In order to deploy, attach, and/or retrieve the pods 102 onto another spacecraft, the spacecraft servicing device 100 may include deployment and/or removal devices (e.g., one or more movable arms, for example, robotic arms 122 having one, two, three, four, five, or six degrees of freedom, a lance and/or extendable deployment device, as discussed below, that may be coupled to a portion of the pods 102, such as an internal portion of the engine) with an associated imaging system (e.g., camera 124) and control and power systems (e.g., robotic avionics 126 and power supply 128). Such devices and components may be utilized to engage with (e.g., to attach to) the pods 102 on the spacecraft servicing device 100. For example, one or more of the robotic arms 122 may be used to couple to one pod 102 (e.g., with an end effector) and to move that pod 102 into proximity of the target spacecraft, to attach the pod 102 to the spacecraft, and to release the pod 102 after attachment.

In some embodiments, other devices and methods may be utilized to deliver and/or attach the pods 102 to the spacecraft. For example, the spacecraft servicing device 100 itself may be oriented relative to the spacecraft to place a selected pod 102 in contact with the spacecraft, the spacecraft servicing device 100 itself may capture or otherwise retain the spacecraft while applying the pod 102, the pods 102 may include one or more onboard systems for controlling and attaching the pods 102, the spacecraft servicing device 100 may include a reusable and separately controllable unit with a propulsion unit control configured to deliver the pods 102, or combinations thereof.

In some embodiments, the spacecraft servicing device 100 may deliver, attach, and/or retrieve the pods 102 to the spacecraft without the use of a robotic arm. For example, with one or more pods 102 attached, the spacecraft servicing device 100 may rendezvous with the target spacecraft (e.g., utilizing sensors to detect the position and/or orientation of the target spacecraft, such as those discussed below). While the pod 102 is attached to the spacecraft servicing device 100, a coupling mechanism of the pod 102, as also discussed below, may be deployed and engaged with the target spacecraft. The pod 102 may be released from the spacecraft servicing device 100 and, before, during, and/or after the release, any remaining docking procedures may be completed in order to secure the pod 102 to the target spacecraft.

Regardless of the particular mechanism or feature utilized to deploy, attach, and/or retrieve the pods 102, the spacecraft servicing device 100 may be configured to directly deliver (e.g., via mechanism and/or features) the pods 102 to a location at the target spacecraft using one or more portions of the spacecraft servicing device 100. For example, the spacecraft servicing device 100 may deploy, attach, and/or retrieve the pods 102 using only the deployment mechanism and/or features (e.g., robotic arm(s) 122, an extendable and/or expandable docking mechanism, etc.) that are resident on (e.g., part of) the spacecraft servicing device 100. In some embodiments, only the deployment mechanism and/or features that are resident on the spacecraft servicing device 100 are utilized while any maneuvering (e.g., propulsion) devices on the pods 102 are not utilized. For example, the pods 102 may be directly manipulated by the spacecraft servicing device 100 while not independently maneuvering and/or manipulating the pods 102 under their own power or propulsion to a location adjacent the target spacecraft. After being moved into position, a mechanism and/or feature of the spacecraft servicing device 100 (e.g., robotic arm(s) 122, an extendable and/or expandable docking mechanism) and/or a feature of the pods 102 (e.g., a coupling mechanism, such as deployment device 160) may be utilized to secure the pod 102 to the target spacecraft. In some embodiments, the pod 102 may be secured to the target spacecraft while the pod 102 remains in at least partial contact with the spacecraft servicing device 100. For example, once the pod 102 is at least partially in contact with (e.g., secured to) the target spacecraft, the pod 102 may be released from the spacecraft servicing device 100.

In some embodiments, the spacecraft servicing device 100 includes sensor assemblies such as rendezvous and proximity operations 130 (e.g., light detection and ranging 132, infrared sensors 134, and/or visible light sensors 136). Such components may enable the spacecraft servicing device 100 to monitor and/or detect other objects (e.g., the pods 102, other spacecraft when servicing related functions are performed). For example, one or more of the sensors (e.g., light detection and ranging 132, infrared sensors 134, and/or visible light sensors 136) may enable the spacecraft servicing device 100 to facilitate rendezvous and proximity operations relative to the target spacecraft 20 (FIG. 1A) in order to deploy, install, and/or remove the pod 102 (FIG. 1A).

In some embodiments, the one or more of the sensors (e.g., light detection and ranging 132, infrared sensors 134, and/or visible light sensors 136) may enable the spacecraft servicing device 100 to detect one or more features of the target spacecraft 20 (FIG. 1A). For example, the one or more of the sensors of the spacecraft servicing device 100 may detect a docking feature (e.g., a docking, berthing, or coupling mechanism) of the target spacecraft 20 or other features (e.g., structural characteristics) of the target spacecraft 20 in order to determine the manner through which the pod 102 should be attached to the target spacecraft 20.

In some embodiments, the spacecraft servicing device 100 may be at least partially reconfigurable to facilitate operations performed by the spacecraft servicing device 100. For example, during coupling (e.g., docking) with a spacecraft 20 (FIG. 1A), device 100 may relocate (e.g., stow, unstow) various structures and/or components (e.g., stanchions used for docking with the spacecraft 20). Such structures and/or components may be detached by one or more tools (e.g., the robotic arm 122) and placed in a temporary storage location. The structures and/or components may be attached when the spacecraft servicing device 100 is docking (e.g., and servicing) the target spacecraft 20.

In some embodiments, features on the spacecraft servicing device 100 may be used to reconfigure other device (e.g., spacecraft). For example, one or more tools (e.g., the robotic arm 122) of the spacecraft servicing device 100 may be used to remove structures that facilitate the stacking of secondary payloads above the spacecraft servicing device 100 after launch. In some embodiments, the spacecraft servicing device 100 (e.g., and the attached pods 102 (FIG. 1A)) may be attached to an ESPA ring or some another suitable structure. After launch (e.g., in orbit), the robotic arm 122 may detach and relocate pods 102 to storage locations and then detach accessory structure used during the launch disposal or temporary storage.

Figure 2B:
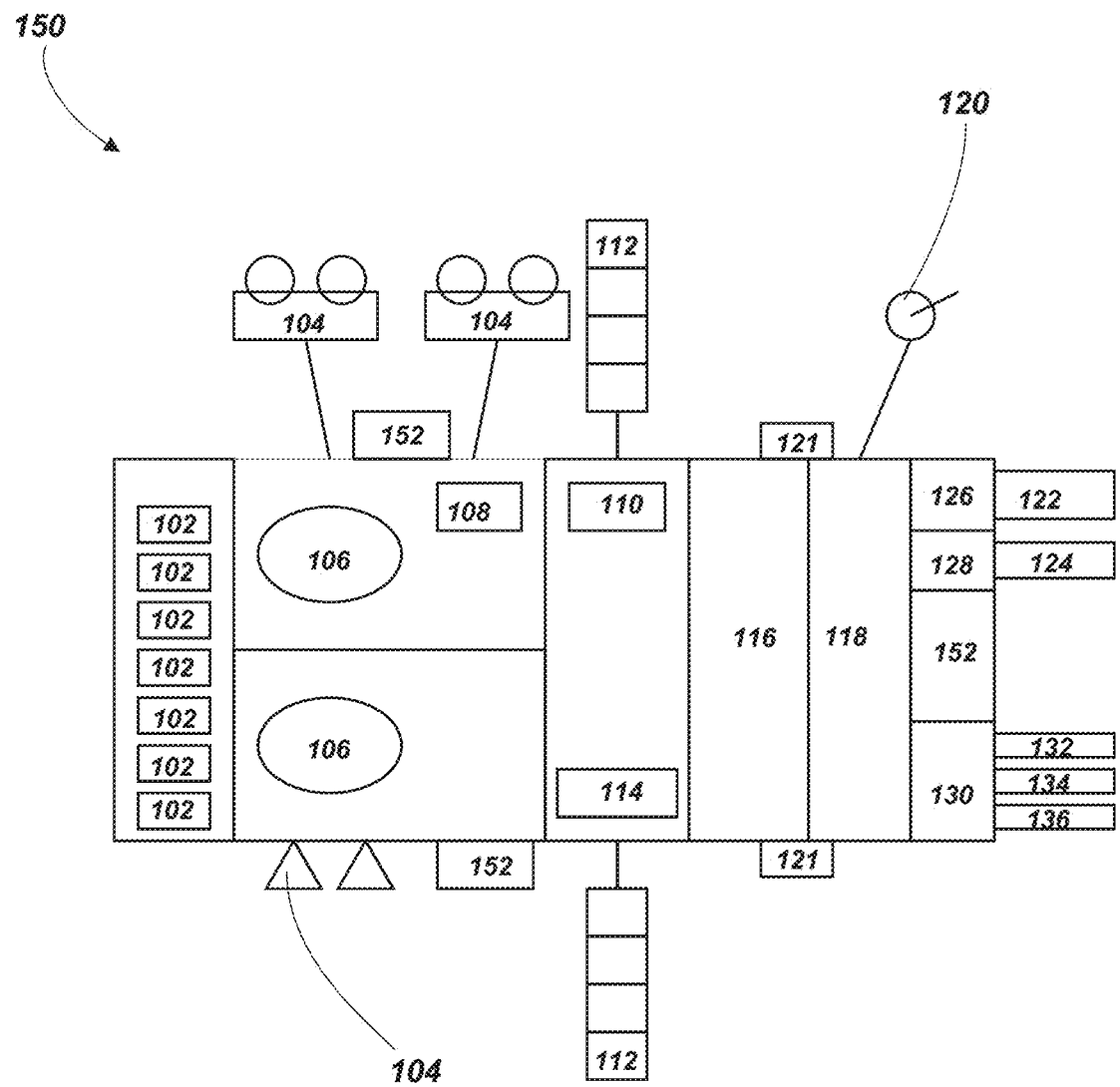
FIG. 2B is a simplified schematic view of a spacecraft servicing device according to one or more embodiments of the present disclosure.

FIG. 2B depicts a simplified schematic view of an embodiment of a spacecraft servicing device 150, which may be substantially similar to the spacecraft servicing device 100 of FIG. 2A and, as depicted, may include some, a majority of, or all of the components of the spacecraft servicing device 100. As shown in FIG. 2B, the spacecraft servicing device 150 includes a coupling mechanism 152 (e.g., a docking, berthing, retaining, or otherwise attaching mechanism) for coupling to other devices (e.g., other spacecraft, such as spacecraft 20, the pods 102, the resupply device 30, etc.).

As discussed above, once on orbit with its initial supply of pods 102, the spacecraft servicing device 100 travels from target spacecraft 20 (FIG. 1A) to target spacecraft 20 to install pods 102. In some embodiments, the spacecraft servicing device 100 may employ additional control techniques to hold at an optimal position relative to the spacecraft 20 to permit installation (e.g., robotic installation) of the pods 102. This optimal position may be centered or not centered on the spacecraft 20 and may stand back from the spacecraft 20 a select distance so that there is room for the pods 102 and the robotic arm 122 to be moved onto the spacecraft. Data from the rendezvous sensors may be sent to the robotics control computers on spacecraft servicing device 100 so that machine vision and robotic motion control algorithms may have a prior knowledge of the relative positions and motions of the two spacecraft.

Figure 2C:
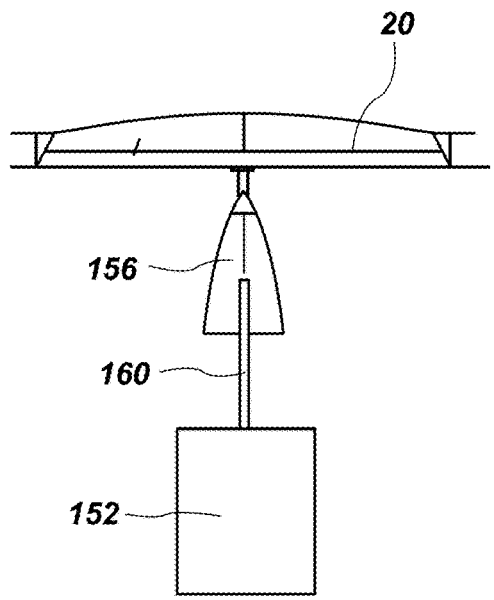
FIGS. 2C through 2K depict various embodiments of coupling mechanisms according to one or more embodiments of the present disclosure.
Figure 2E:
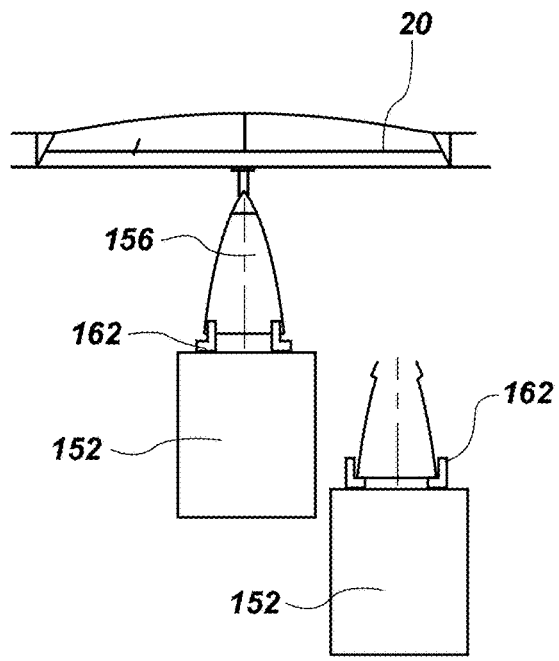
Figure 2D:
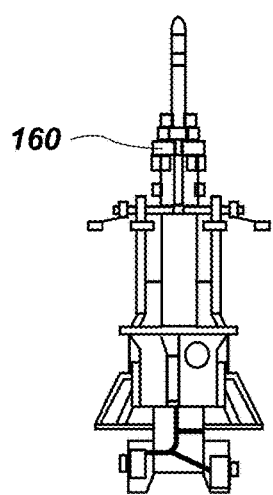

FIGS. 2C through 2K depict various embodiments of coupling mechanisms according to one or more embodiments of the present disclosure. As shown in FIGS. 2C and 2D, the coupling mechanism 152 may comprise an expandable docking mechanism 160 (e.g., having a spear shape) configured to be received in a receiving portion (e.g., engine 156) of at least one of the spacecraft 20 (e.g., a portion of an engine or any other portion to which a mechanical coupling may be made). The expandable docking mechanism 160 is guided into position either entirely by the spacecraft servicing device 100 (FIG. 2A) or by having a robotic arm guide the final docking while the spacecraft servicing device 100 holds the position relative to the spacecraft 20. Once in place, one or more expandable portions may deploy and contact the receiving portion 156 in order to secure the expandable docking mechanism 160 to the spacecraft 20.

Such an expandable docking mechanism 160 is disclosed in, for example, U.S. patent application Ser. No. 15/829,807, filed Dec. 1, 2017, titled "SYSTEMS FOR CAPTURING A CLIENT VEHICLE," the disclosure of which is hereby incorporated herein in its entirety by this reference. For example, the expandable docking mechanism 160 may be inserted within the engine 156 of the spacecraft 20 as shown in FIG. 2C. Once inserted in the engine 156, one or more portions of the expandable docking mechanism 160 may be moved (e.g., expanded, extended) in order to contact the engine 156 and secure the expandable docking mechanism 160 to the engine 156, thereby, securing the pod 102 (FIG. 1A) to the spacecraft 20. Before, after, and/or during the securing, the expandable docking mechanism 160 may include an extension arm that is retracted to place the pod 102 (FIG. 1A) into closer proximity to the spacecraft 20.

Figure 2F:
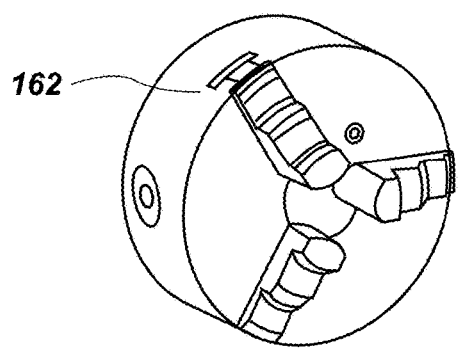

As shown in FIGS. 2E and 2F, the coupling mechanism 152 may comprise an expandable and/or retractable docking mechanism 162 (e.g., having the shape of a chuck) configured to engage with the receiving portion 156 of the spacecraft 20. The docking mechanism 162 may be guided into position in a manner similar to that described above. Once in place, docking mechanism 162 may either retract or expand in order to secure the expandable docking mechanism 162 to the spacecraft 20.

Figure 2G:
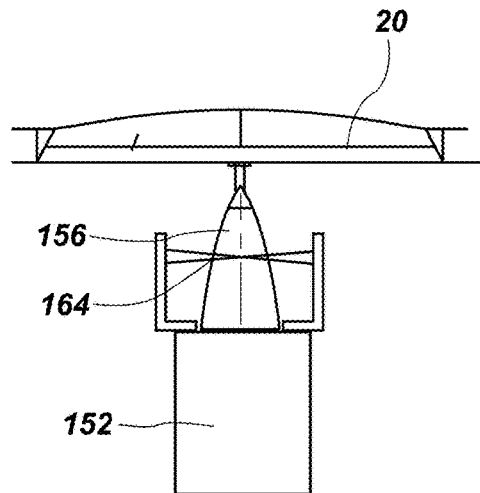
Figure 2I:
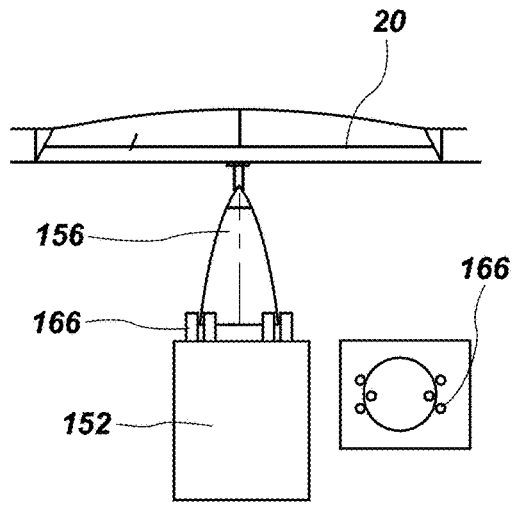
Figure 2H:
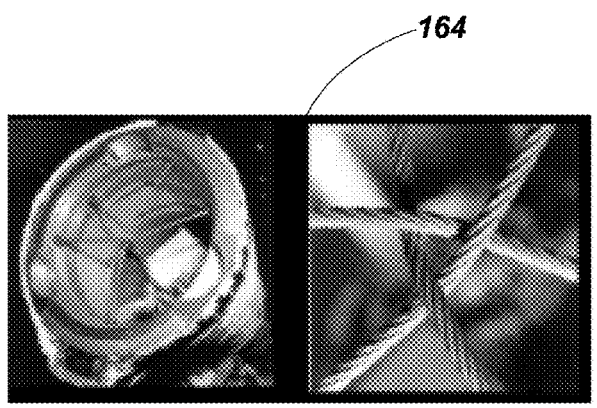

As shown in FIGS. 2G and 2H, the coupling mechanism 152 may comprise a snare docking mechanism 164 (e.g., including a plurality of wires, for example, braided metal wires, positioned at an opening of a cavity). The snare docking mechanism 164 may be guided into position in a manner similar to that described above. The snare docking mechanism 164 is configured to engage with the receiving portion 156 of the spacecraft 20 by enabling the receiving portion 156 to enter through an opening in the wires. Once in place, the snare docking mechanism 164 may move (e.g., rotate) such that the wires at least partially restrict the opening defined by the wires to secure the snare docking mechanism 164 to the spacecraft 20.

Figure 2J:
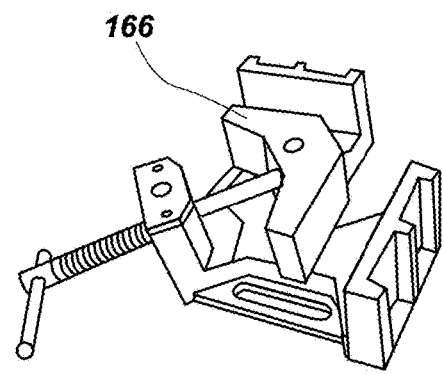

As shown in FIGS. 2I and 2J, the coupling mechanism 152 may comprise a clamping docking mechanism 166 (e.g., a three-point clamping mechanism including a movable member and two stationary members) configured to engage with the receiving portion 156 of the spacecraft 20. The docking mechanism 166 may be guided into position in a manner similar to that described above. Once in place, the movable member or members of the docking mechanism 166 may move toward the stationary member or members in order to secure the expandable docking mechanism 166 to the spacecraft 20.

Figure 2K:
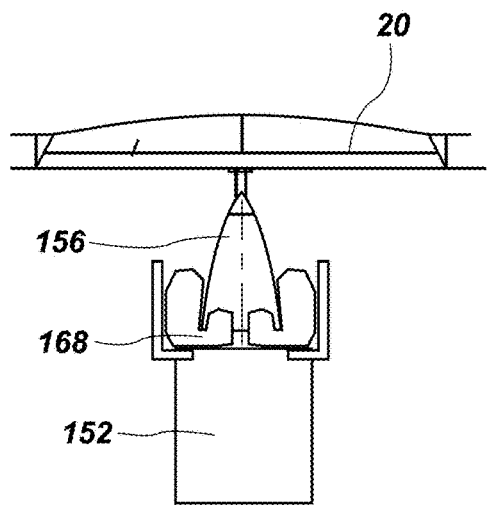

As shown in FIG. 2K, the coupling mechanism 152 may comprise an inflatable clamping docking mechanism 168 (e.g., one or more inflatable bags configured to be received on an exterior portion and/or an interior portion of the receiving portion 156) configured to engage with the receiving portion 156 of the spacecraft 20. The docking mechanism 168 may be guided into position in a manner similar to that described above. Once in place, the inflatable bag (e.g., an annular bag) or bags (e.g., two opposing bags) may be inflated in order to secure the expandable docking mechanism 168 to the spacecraft 20. In some embodiments, the bag may be filled with a fluid (e.g., liquid) that will at least partially solidify to form an at least partially rigid connection between the structures.

Figure 2L:
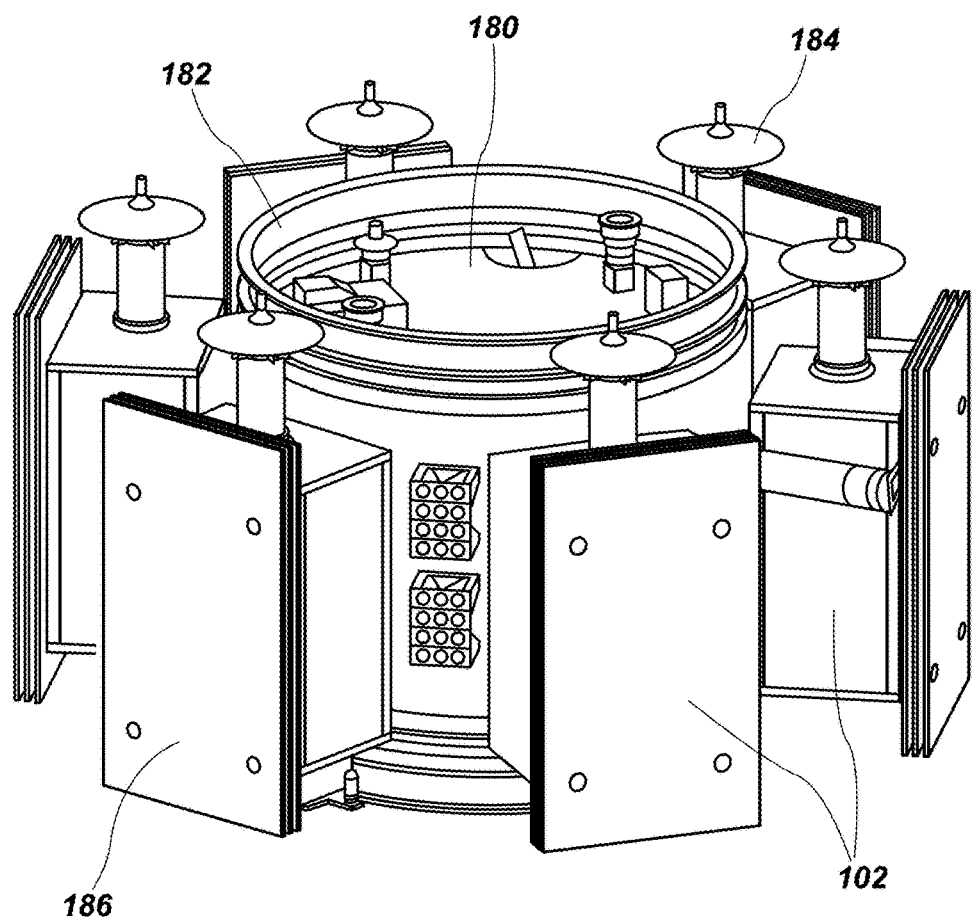
FIG. 2L is a perspective view of a spacecraft servicing device according to one or more embodiments of the present disclosure.

FIG. 2L is a perspective view of a spacecraft servicing device 180 that may be similar to those discussed above. As depicted, the spacecraft servicing device 180 may include a body 182 comprising an ESPA ring with pods 102 coupled about the body 182. Each pod 102 may include a coupling mechanism 184 for coupling with a target spacecraft 20 (FIG. 1A) and an optional solar array 186. As above, the coupling mechanism 184 may comprise a spear-shaped extendable device configured to engage with the engine of the target spacecraft 20.

Referring to FIG. 1A, in yet additional embodiments, a structural portion of the pods 102 (e.g., a stanchion or other frame member) may be utilized to the dock with the spacecraft 20. For example, a robotic arm or other feature (e.g., a non-robotic method) would first position the pod 102 at a predetermined location depending on the geometry and features of the spacecraft 20 and components (e.g., separation rings) of the spacecraft 20. The spacecraft servicing device 100 may then dock to the spacecraft 20 using the structural portion of the pod 102. Once the docking is complete, the structural portion of the pod 102 may be secured to the spacecraft 20 (e.g., by actuating a clamp or otherwise rigidizing the coupling via an electronic command through the robotic interface or via electromechanical drive power from the robotic interface). A portion of the spacecraft servicing device 100 (e.g., the robotic arm) may then release the pod 102 and the spacecraft servicing device 100 may undock from the spacecraft 20 leaving behind the pod 102 installed on the spacecraft 20 (e.g., on a separation ring).

In yet additional embodiments, a portion of the spacecraft servicing device 100 (e.g., a robotic arm) may reach out and place the pods 102 on a portion of the spacecraft (e.g., a separation ring or other compatible mechanical feature of the spacecraft 20). An electronic command to the pod 102 or spacecraft 20 to actuate a coupling mechanism or electromechanical drive on either device may then be used to secure the pod 102 in place on the spacecraft 20.

Referring to FIG. 2A, in instances where the robotic arm is used to place the pods 102, the robotic arm 122, an end effector, and/or other tools may employ techniques related to docking mechanism 166 that minimize zero gravity contact dynamics between the two vehicles. Such techniques include, but are not limited to, minimizing friction at contact interfaces, minimizing the time between first contact and rigidization (e.g., completion of docking or other coupling), and providing compliance in the path. In some embodiments, passive and active first contact electrostatic discharge (ESD) mitigation techniques may be employed in the design of the pods 102, the robotic arm 122, the spacecraft servicing device 100, and the resupply device 30 to ensure that first contact ESD is minimized or eliminated. Such ESD mitigation is disclosed in, for example, U.S. patent application Ser. No. 15/829,758, filed Dec. 1, 2017, titled "ELECTROSTATIC DISCHARGE MITIGATION FOR A FIRST SPACECRAFT OPERATING IN PROXIMITY TO A SECOND SPACECRAFT," the disclosure of which is hereby incorporated herein in its entirety by this reference.

Referring to FIG. 1A, it may be desirable, when installing the pods 102 on a spacecraft 20, to have as brief a connection as possible between the spacecraft servicing device 100 and the spacecraft 20. In some embodiments, during installation of the pod 102, both the spacecraft 20 and the spacecraft servicing device 100 may be in free drift together for only a brief period of time (e.g., seconds to minutes) in which the installation of the pod 102 is established and the spacecraft servicing device 100 releases the pod 102 to break the mechanical connection between the two vehicles. The spacecraft servicing device 100 propulsion system may then be reactivated and the spacecraft servicing device 100 may retreat to a safe location. The spacecraft 20 attitude control system may be reactivated shortly thereafter so that the target spacecraft 20 can reacquire its positioning.

Referring to both FIGS. 1A and 2A, in some embodiments, after installation, the pods 102 may be activated via, for example: a ground command to a transceiver in the pod 102, an electrical command from the robotic arm 122, e.g., with a timer, sensor (e.g., a break-wire timer or similar sensor) that enables the pod 102 to sense that it is no longer connected to any of the spacecraft servicing device 100, the resupply device 30, or the robotic arm 122. In some embodiments, such sensors may include one or more mechanical limit switches activated by the completion of the docking or installation mechanical activity.

In yet additional embodiments, the pods 102 may be activated via a feature incorporated into the interface between the spacecraft servicing device 100 and the pod 102. For example, a portion of the deployment device of the spacecraft servicing device 100 (e.g., the tool drive mechanism or end effector on the robotic arm 122) may assist in the activation and/or initial deployment of appendages on the pods 102. Such a technique would potentially simplify the pod 102 mechanisms by taking advantage of the functionality of the robotic arm 122 of the spacecraft servicing device 100 (e.g., an end effector of the arm 122) to perform deployment and initiation of the pods 102 (e.g., one-time actuations on the pods 102). The robotic arm 122 and/or components and tools thereof may perform at least partial in-orbit assembly of the pods 102. For example, use of the robotic arm 122 for final assembly of appendages onto the pods 102 may allow for simplified, lighter, and/or lower cost packaging of the pods 102 components for launch.

Figure 3:
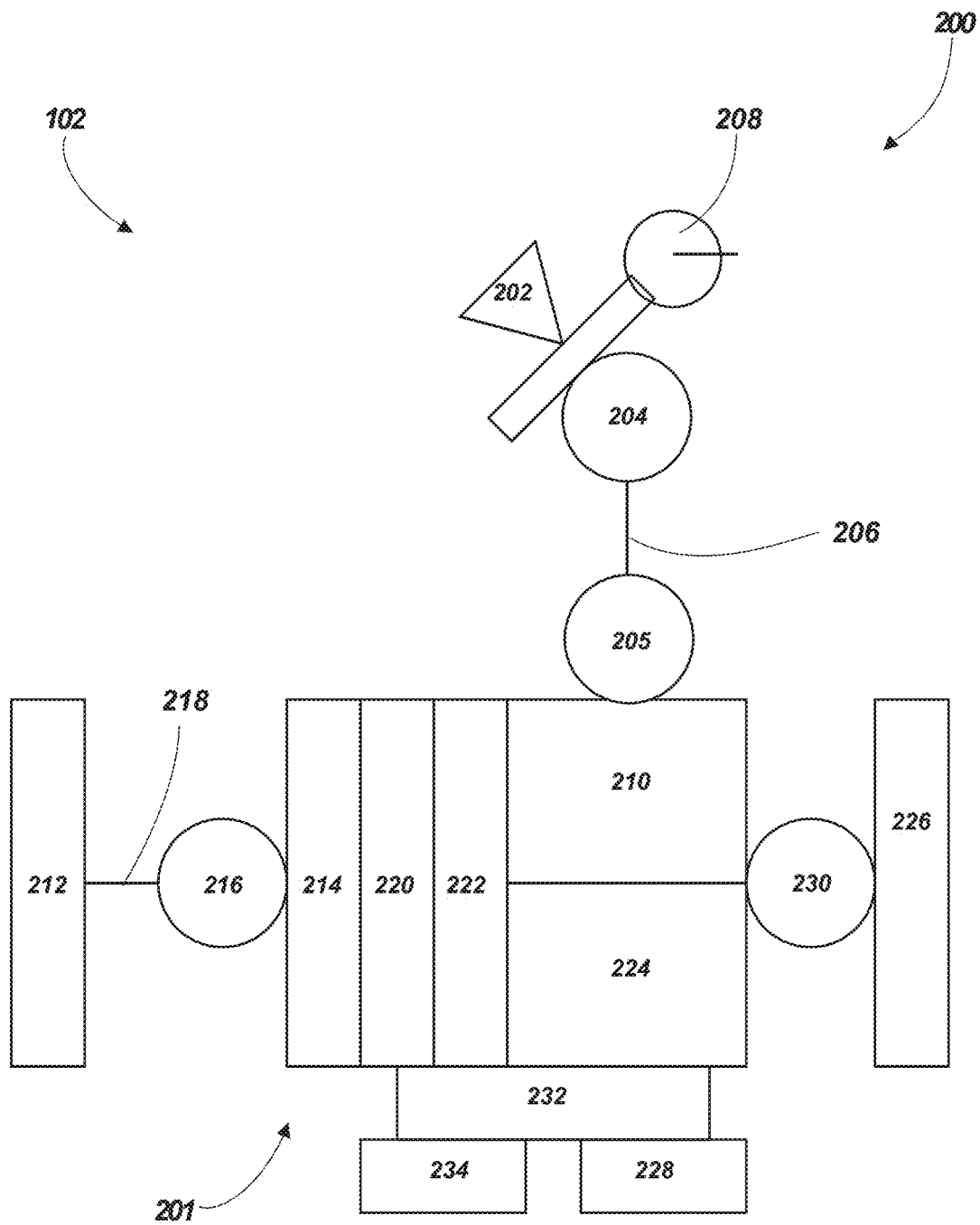
FIG. 3 is a simplified schematic view of a mission extension pod according to one or more embodiments of the present disclosure.

FIG. 3 depicts a simplified schematic view of an embodiment of a pod (e.g., mission extension pod 102 of FIG. 1A) of the spacecraft servicing device 100. As shown in FIG. 3, the mission extension pod 102 includes one or more devices for controlling (e.g., orienting and moving) the pod 102 and any other structure attached to a main body 201 of the pod 102. For example, the pod 102 may include a chemical or another type of reaction engine and/or may include an electrically powered propulsion system. As depicted, one or more thruster assemblies 200 may include one or more thrusters 202 (e.g., electric propulsion (EP) thrusters) attached (e.g., movably attached) to the pod 102 with a movable (e.g., rotatable) coupling (e.g., gimbal 204 and a boom 206). In some embodiments, the positioning of the thrusters 202 relative to the main body 201 may be selected based on one or more characteristics (e.g., size, dimensions, mass, center of mass, combinations thereof, etc.) of the spacecraft to which the pod is to be attached. In some embodiments, the thrusters 202 may provide relatively low acceleration to minimize or avoid disturbances due to the propellant moving around in a propellant tank.

While the embodiment of FIG. 3 illustrates one thruster assembly 200 on a single boom 206, in other embodiments, the pod 102 may include multiple thruster assemblies on multiple booms (e.g., two, three, or more thruster assemblies and accompanying booms). For example, two thruster assemblies may be provided on two booms where one thruster assembly substantially mirrors the other thruster assembly. Further, in some embodiments, multiple thruster assemblies may be provided on a single boom. In such an embodiment, multiple thrusters may be implemented to ensure that the lifetime throughput capability of the system is adequately realized or the desired thrust levels are reached. In some embodiments, one or more thruster assemblies 200 may not be provided on a boom, but installed directly on the pod 102. In some embodiments, one thruster assembly 200 may be used for life extension services, including spacecraft relocation, station keeping, inclination pull-down, momentum adjustments, and/or end of life (EOL) disposal. In some embodiments, multiple thruster assemblies 200 may each be used for all life extension services or may be divided for different life extension services. For example, one or more thruster assemblies 200 may be provided on one or more booms for station keeping services, while one or more thruster assemblies 200 may be installed on the pod for orbit relocation, inclination pull-down, and EOL disposal.

In some embodiments, antenna 208 may be positioned on the thruster assembly 200. In some embodiments, antenna 208 may be positioned on a separate deployable boom. In some embodiments, additional solar cells to generate power may be placed on the thruster boom assembly 200.

The pod 102 may include a power and propulsion system 210 including one or more power sources and associated componentry (e.g., where at least a portion of the power system may be an electric propulsion power system). For example, the power system and propulsion system 210 may include one or more propellant tanks (e.g., housing a xenon propellant or any other suitable propellant for electric or chemical propulsion systems), thrusters (e.g., electronic thrusters) and associated power processing units. The pod 102 may include a solar array 212 and one or more batteries 214. In some embodiments, the solar array 212 may be rigidly coupled to the main body 201 or attached with a movable (e.g., rotatable) coupling with one or more axes of motion (e.g., one or more gimbals 216 or other movable joints and a boom 218 providing movement about one, two, or more axes) to direct the solar array 212 toward the sun.

In some embodiments, the gimbaled solar array 212 may provide many advantages over a similar rigid array. For example, the gimbaled solar array 212 enables the solar array 212 to be removed from/spaced from thrusters of the target spacecraft 20 so that the target spacecraft 20 may perform orbit maintenance while minimizing concerns of the thrusters of the target spacecraft 20 pluming onto the solar arrays of the pod 102. The gimbaled solar array 212 may further decouple the pod 102 thermally from the target spacecraft 20 and increase the effectiveness of the solar array 212 by enabling it to track the Sun. An increase in effectiveness of the gimbaled solar array 212 enables the thrusters of the pod 102 to fire longer and it also enables the use of smaller, lighter, and more inexpensive batteries. A longer firing propulsion system may facilitate the servicing of heavier target spacecraft 20. In some embodiments, the gimbaled solar array 212 may be articulated in a way to conserve momentum (e.g., where no net momentum is imparted) upon the target spacecraft 20 over an orbit.

In some embodiments, the solar array 212 may track the sun utilizing stored logic on the pod 102 during the sunlit portions of the satellite servicing in order to maximize solar array 212 power generation, thereby minimizing the solar array 212 and battery size. In some embodiments, the movement of the solar array 212 may be limited, for example, to simplify the mechanical design and to eliminate or minimize the shadowing of the spacecraft arrays, impingement from thruster plumes on the pod 102 and/or spacecraft 20, interference with sensors or antennae on the pod 102 and/or spacecraft 20, or other system constraints. In some embodiments, the solar array 212 may include two separate wings with one or two axes of motion. In some embodiments, the gimbaled solar array 212 may include one axis of movement configured to counteract the rotation of the pod 102.

Embodiments of the pod 102 may provide spacecraft servicing in a relatively physically small package and light footprint on the spacecraft vehicle 20 (FIG. 1A) by using low power (e.g., electric) propulsion systems, such as gridded ion thrusters, Hall effect thrusters, colloidal/field effect thrusters, arcjets, and resistojets. Such an electric propulsion system may produce the required amount of thrust over a selected time period for one or more burns to adjust positioning of the spacecraft 20 (e.g., burning twice in a twenty-four hour period) where each thrust lasts a select period of time. In some embodiments, the pod 102 may be positioned on the zenith (e.g., anti-earth) facing side of the spacecraft and the solar array 212 of the pod 102 in order to experience unobscured sunlight for at least twelve hours per day. In some embodiments, one thruster burn may occur while the solar array 212 of the pod 102 is fully illuminated, while a second thruster burn occurs with the solar array 212 of the pod 102 completely obscured by the spacecraft body.

In some embodiments, each thruster burn during a twenty-four hour period may occur while the solar array 212 of the pod 102 is obscured by the spacecraft 20 body. In some embodiments, each thruster burn during a twenty-four hour period may occur while the solar array 202 of the pod 102 is fully illuminated. A battery (e.g., battery 214, such as a lithium-ion battery) may be used to store energy during the period of pod 102 solar illumination, and the battery 214 may be sized to support the pod 102 bus power draw as well as a thruster burn power during the periods of no sunlight. In some embodiments, the thruster burns are performed with chemical thrusters.

In some embodiments, the propellant of the power and propulsion system 210 of the pod 102 may include an amount of propellant (e.g., around 25 kg, 50 kg, 100 kg, 150 kg or more) to support station keeping (e.g., maneuvering and momentum adjustment requirements) of the spacecraft 20 (FIG. 1A) for a selected period of time (e.g., at least a number of years). The pod 102 may be loaded with the propellant prior to launch so that no propellant transfer is required once in orbit. As the spacecraft 20 requires relocation to a different orbital location for continuation of its operational life or reaches the end of its operational life, the pod 102 thrust schedule and position can be adjusted to deliver change in velocity in the orbit velocity direction of the spacecraft 20 to move the spacecraft 20 to a different orbit, orbit location, or combination thereof, for purpose of operational life extension or end-of-life disposal.

In some embodiments, the fuel or propellant of the pod 102 may be utilized to service the spacecraft 20 without relying on one or more systems of the spacecraft 20. For example, only the propellant of the pod 102 may be utilized to service the spacecraft 20 (e.g., maneuvering and/or adjusting at least one momentum, including attitude, of the spacecraft 20).

Referring to FIGS. 1A and 3, in some embodiments, the fuel tank 24 of the spacecraft 20 may be bypassed (e.g., not be utilized) to service the spacecraft 20. For example, the propellant of the pod 102 (e.g., supplied from tank 141 in a configuration similar to that shown in FIG. 1B, supplied from a tank of the propulsion system 210 of the pod 102) may supplied (e.g., directly supplied) through fluid flow channels to a portion of a propellant system 22 of the target spacecraft 20 (e.g., while bypassing the fuel tank 24 of the spacecraft 20 connected to those fluid flow channels). In such an embodiment, the propellant of the pod 102 may be utilized to service the spacecraft 20 without transferring (e.g., refueling) the propellant to the tank 24 of the spacecraft 20 (e.g., through a refueling procedure). For example, the propellant of the pod 102 may be coupled (e.g., fluidly coupled via coupling mechanism 152, mating adapter 145 (FIG. 1B), etc.) to a portion of the fuel system of the spacecraft 20. In some embodiments, such an existing connection may exist on the spacecraft 20. In some embodiments, one or more of the spacecraft servicing device 100 and the pod 102 may install at least a portion of the connection on the spacecraft 20.

Propellant from the pod 102 may be transferred into the propellant system 22 of the target spacecraft 20 and be utilized to service the spacecraft 20 (e.g., maneuvering and/or adjusting at least one momentum of the spacecraft 20) using, for example, one or more thrusters of the propellant system 22.

In some embodiments, the pod 102 may lack propulsion devices for independently moving the pod 102.

In some embodiments, the pod 102 may have a relatively low overall mass, such as, for example, less than 700 kilograms (kg) (e.g., less than 600 kg, 500 kg, 400 kg, 350 kg, 300 kg, or less).

In some embodiments, the pods 102 are configured to remain permanently on the spacecraft 20 and are not recovered or replaced. In some embodiments, the pods 102 may be detached from the spacecraft 20 and used on a different client spacecraft. In some embodiments, the pods 102 may be detached from the spacecraft 20, refueled by the spacecraft servicing device 100 or resupply device 30, and reattached to the spacecraft 20.

The pod 102 may include power controls (e.g., a single circuit board of power controls 220) and flight controls (e.g., a single circuit board of avionic controls 222) provided on any suitable type and number of electronic devices.

The pod 102 may include a communication subsystem 224 (e.g., radio frequency (RF) communications in communication with the antenna 208 and a transceiver (XCVR). The communication subsystem 224 of the pod 102 may be designed to operate with commercially available communications services with a periodic contact rather than continuous contact requirement.

In some embodiments, a communication device of the pod 102 (e.g., communication subsystem 224) may receive data relating to the at least one of an orbit or a velocity of the target spacecraft 20 (FIG. 1A) (e.g., relating to a momentum of the spacecraft 20). Such data may be transmitted or otherwise transferred to the pod 102 from a location remote from the pod 102 (e.g., directly or indirectly through the ground station, a satellite relay, direct transmission, and/or an electrical connection, such as, directly from the target spacecraft 20). Such data may include calculations for a related burn and/or systems of the pod 102 may preform calculations for the burn based on the data. In some embodiments, the telemetry data may be provided from the target spacecraft 20 to the pod 102 (e.g., through a radio frequency link), either directly or indirectly through a ground station. In some embodiments, the telemetry data may be provided from one or more of the target spacecraft 20, the spacecraft servicing device 100, or from a ground station to the pod 102, either directly or indirectly.

In some embodiments, the telemetry data may be updated at selected intervals in a closed loop system and subsequent burns may be calculated based on the updated data.

In some embodiments, the predetermined burn schedule may be provided to the pod 102 or another portion of the system 10.

In some embodiments, the pod 102 may lack any independent systems for determining the telemetry data (e.g., velocity, attitude, momentum, position, orbit, etc.) of the pod 102 and/or the target spacecraft 20 and may need to rely on an exterior source (e.g., the target spacecraft 20, a ground station, the servicing mother ship device 100) for such information.

Pod 102 may store telemetry data over a time period (e.g., eight to twelve hour period) and return this data to the communications network when polled on a selected schedule (e.g., two or three times daily). The total data set may be relatively small, resulting in a relatively short contact time, which provides a relatively low cost footprint for operating numerous pods 102 over a period of multiple years. In some embodiments, the pod 102 may be positioned on the non-earth-facing side of the target spacecraft 20 (FIG. 1A). In order to provide a line of sight to ground station antennas and/or orbiting communications services, the transceiver antenna 208 may be positioned on the same boom carrying the thruster assembly 200 to provide a clear line of sight. Given the geosynchronous orbit range and the low power nature of the components of the pod 102, along with a relative modest gain antenna 208, pod 102 may forward and return data at relatively low data rates (e.g., less than one kb/s, less than a few kb/s). Thus, the pod 102 is capable of receiving a limited set of commands to adjust its thrust schedule and boom pointing in accordance with adjustments specified by the spacecraft 20 spacecraft operators from Earth.

In some embodiments, one or more portions of the system 10 (FIG. 1A) (e.g., the pod 102) may utilize a flexible frequency transceiver, which may enable the pod 102 to be in communication with a ground station associated with the spacecraft 20. By using a flexible frequency transceiver and using an existing ground system for the spacecraft 20, the pod 102 may not require any additional regulatory agency licensing or third party services to establish command and telemetry connectivity between the pod 102 and the ground station for the spacecraft 20. This may enable an operator of the spacecraft 20 to establish control (e.g., full control) over the pod 102 at relatively minimized additional investment with little to no regulatory disclosures or licensing necessary. Given that the market base for target spacecraft 20 includes a relatively large amount of spacecraft 20 utilizing C-band and Ku-band RF frequencies for communication, the launched pods 102 may be configured with either C-band or Ku-band transceivers. Prelaunch coordination may establish the ratio of pods 102 with either C-band or Ku-band based communication systems that would be launched on either the initial capability or in the resupply spacecraft. If a target spacecraft 20 does not utilize C-band or Ku-band communications, the pods 102 may be configured to implement the type of communication system to substantially match that of the target spacecraft 20 or a C-band or Ku-band pod 102 may still be utilized with the target spacecraft 20 having a differing type of communication system. In some embodiments, a pod 102 may store its telemetry data over a select time period (e.g., eight to twelve hours) and may return this data to the communications network when polled (e.g., two or three times daily).

In some embodiments, the flexible frequency transceiver may enable the pod 102 to mate with a variety of target spacecraft 20 as frequencies of the flexible frequency transceiver may be modified based on the target spacecraft 20 in orbit (e.g., to utilize an unused portion of one or more bands of frequencies utilized by the target spacecraft 20).

In some embodiments, a space-to-space command and telemetry link between the pods 102 and spacecraft servicing device 100 may be implemented to utilize the relatively larger gain and power of the spacecraft servicing device 100 to connect the pods 102 to the ground system of the spacecraft 20. In some embodiments, this technique may be employed while the spacecraft servicing device 100 is in fairly close proximity with pods 102 and/or may be implanted for long-term operations where the pods 102 thruster burn schedule may only require occasional adjustments (e.g., adjustments performed weekly, monthly, or a longer intervals).

In some embodiments, a communication system of the pods 102 may use a transceiver that is designed to take advantage of the close proximity of the antenna of the pods 102 to the uplink antenna of the spacecraft 20 to feed a spread spectrum telemetry signal from the pods 102 into the uplink of the spacecraft 20. That signal then receives a high gain boost by the communications system of the spacecraft 20 to send telemetry from the pod 102 to the ground.

The various communication systems in the pods 102 disclosed herein may enable monitoring of the functions of and results achieved from the pod 102 in near real time, with time lag only due to speed of light from geosynchronous orbit to ground. Such configurations may enable the pod 102 to perform a number of functions (e.g., such as those described above) where those functions can return performance data to the ground station. Software in the ground station as well as in the target spacecraft 20 or the pod 102 may also be utilized to "close the loop" with speed of light lag such that data from pod 102 or the target spacecraft 20 may be delivered into the software associated with the target spacecraft 20 or the pod 102 to control the target spacecraft 20. In some embodiments, the pod 102 may not be required to directly communicate with the spacecraft 20 that hosts the pod 102 and may communicate with the spacecraft 20 via the speed of light round trip time lag through the ground station. In such an embodiment, it is possible to "close the loop" for complex functionality that may be provided in the form of the pod 102 spacecraft servicing. For example, this complex functionality may include the ability to manage three axes of momentum of the spacecraft 20 with the thruster assemblies 200 of the pod 102 by means of a gimbal control logic resident in ground software or pod software using telemetered data from the spacecraft 20.

In order to deploy and attach the pod 102 onto another spacecraft 20 (FIG. 1A), the pod 102 may include an attachment feature (e.g., a coupling mechanism 226 configured for one or more of docking with, berthing to, attaching to, retaining, or combinations thereof, a target spacecraft 20)

configured to attach to the spacecraft 20 and/or one or more coupling features (e.g., grapple mechanism 228) that may be engaged by a feature of the spacecraft servicing device 100 (FIG. 2A) (e.g., a robotic arm 122). The coupling mechanism 226 may be movably mounted to the main body 201 (e.g., with gimbal 230).

In some embodiments, the thruster assembly 200 of the pod 102 may be positioned on a multi-axis actuator system (e.g., defined by a number of gimbals and/or other translation or rotation devices). For example, gimbal 204 may be configured to move the thruster assembly 200 in a first axis of direction and gimbal 205 may be configured to move the thruster assembly 200 in a second axis of direction that is transverse to the first axis of direction. In some embodiments, the gimbals 204, 205 may be collocated at the thruster assembly 200. In some embodiments, the gimbals 204, 205 may be separated by a boom. The pod 102 may include a third gimbal 230 (e.g., for rotating the main body 201 relative to the spacecraft 20 (FIG. 1A)) for positioning gimbals 204, 205 relative to the spacecraft body. In some embodiments, the pod 102 may include a third gimbal 230 proximate gimbal 204 (e.g., between the main body 201 and the boom 206). Such a third gimbal 230 may act in cooperation with gimbals 204, 205 to create three degrees of freedom (e.g., three rotational degrees of freedom).

In some embodiments, the grapple mechanism 228 may be spaced from the main body 201 with one or more structures 232 to facilitate coupling with the robotic arms 122 of the of the spacecraft servicing device 100 (FIG. 2A).

The pod 102 may include a mechanism utilized to secure the pod 102 to the spacecraft servicing device 100 (FIG. 2A). For example, the pod 102 may include stow mechanism 234 (e.g., which may be spaced from the main body 201 with the structure 232) that couples with a portion of the spacecraft servicing device 100. In other embodiments, one or more of the above existing features (e.g., the coupling mechanism 226 and/or the grapple mechanism 228) or another feature may be used to secure the pod 102 to the spacecraft servicing device 100.

As discussed above, the pod 102 may be configured to deliver a change in orbital velocity (e.g., station keeping, relocation, EOL disposal) to the spacecraft 20 (FIG. 1A), for example, while being separated from (e.g., not in communication with) the control systems of the spacecraft 20. In other words, the pod 102 alone may alter the trajectory (e.g., orbit) of the spacecraft 20 while being attached to the spacecraft 20, but not being in communication with the control systems of the spacecraft 20. The change in velocity may be supplied from the thrusters 202 (e.g., ion thruster, Hall current thruster, gridded ion thruster, Hall effect thruster, or any other suitable type of electric or chemical thruster that generates any suitable level of thrust).

In some embodiments, as discussed above, the pod 102 may function, at least partially, as an auxiliary fuel tank (e.g., a tank of high pressure xenon, hydrazine, helium, nitrogen tetroxide (NTO), a green propellant, combinations thereof, or any other suitable fuel) that is coupled to spacecraft 20 (e.g., FIG. 1A) (e.g., to an exterior of the spacecraft 20). For example, the pod 102 may include one or more of such tanks in the power and propulsion system 210. In other embodiments, as discussed below, the pod 102 may comprise only the fuel tank along with associated componentry configured to attach to and place the tank in communication with the spacecraft 20.

In some embodiments, the pod 102 may essentially only comprise an auxiliary tank system and may not include a majority or any of the above-described components. Such an auxiliary tank system pod 102 may include a service valve to initially pressurize the system, mechanical supports for equipment and attachment to the spacecraft, grappling appendages, and/or passive thermal control. In some embodiments, a deployment device (e.g., a robotic arm) may be used to place the auxiliary tank system pod 102 at its destination, which destination may be cooperatively designed to or to not to host the tank. The target spacecraft 20 for this transfer tank pod 102 may either have cooperatively designed interfaces for gas and fluid transfer or, when the spacecraft 20 lacks such interfaces, the auxiliary tank system pod 102 may include an interface configured to adapt to varying sizes and configurations of fittings on such spacecraft 20.

Figure 4:
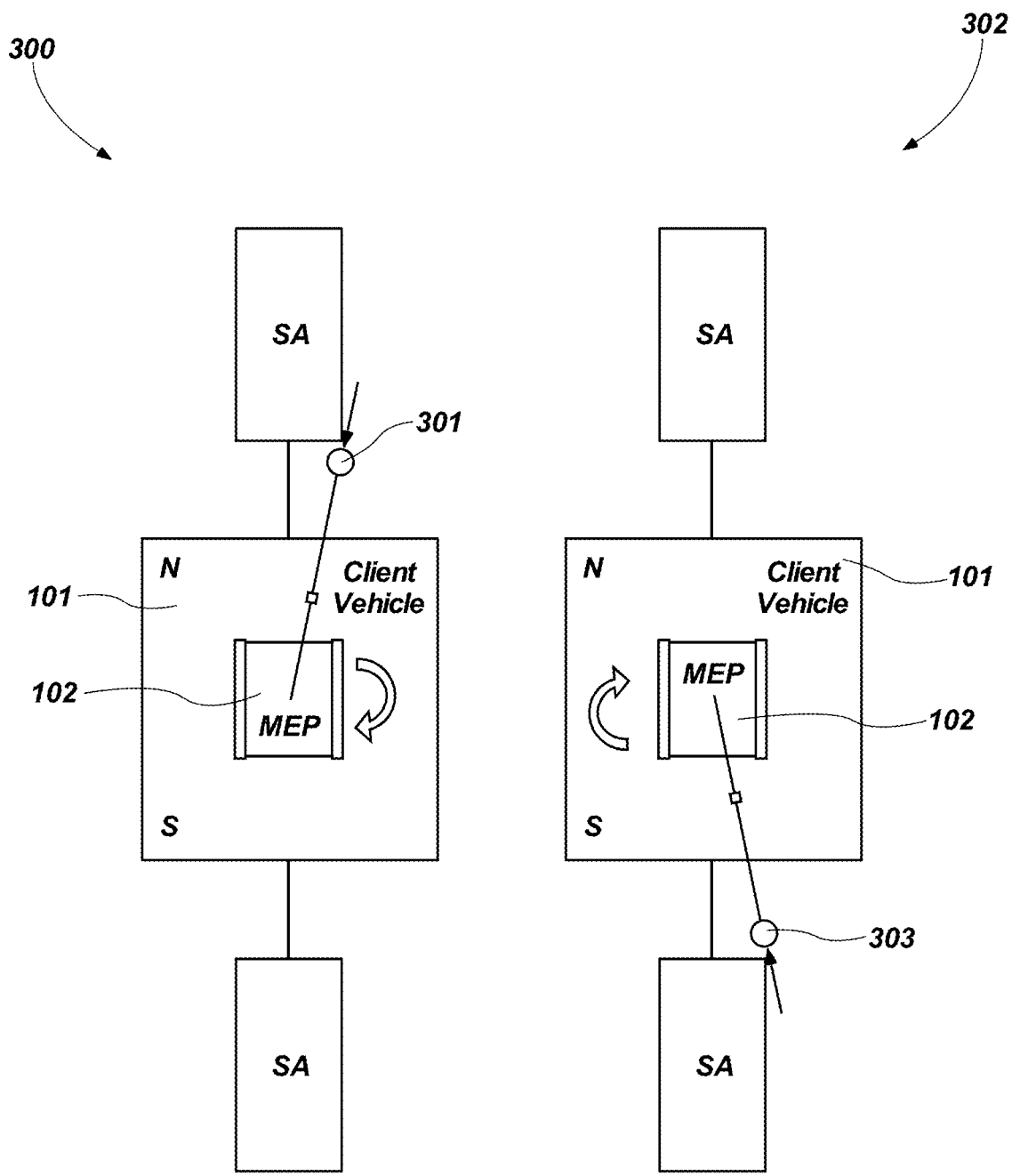
FIG. 4 is a simplified schematic view of a mission extension pod attached to a spacecraft in two thrust vector orientations according to one or more embodiments of the present disclosure.

FIG. 4 is a simplified schematic view of a pod 102 attached to a spacecraft 20 in a first configuration 300 with a first thrust vector orientation 301 and in a second configuration 302 with a second thrust vector orientation 303. Referring to FIGS. 3 and 4, the gimbals 204, 205, 230 may provide a select number of degrees of freedom (e.g., two degrees of freedom, three degrees of freedom) for pointing the thrust force vector through the center of mass of the spacecraft 20. Thrust may be generated on command (e.g., from a remote ground station) and/or on a schedule (e.g., a predetermined schedule and/or a schedule actively transmitted to the pod 102) based on the initial position of the spacecraft 20 in orbit and may reduce or even remove the burden of station keeping and momentum unloading from the propulsion subsystem of the spacecraft 20. In some embodiments, the amount of thrust and/or thrust force vectors may be transmitted to the pod 102 via a communications link to the pod 102 on any desirable schedule.

Figure 5:
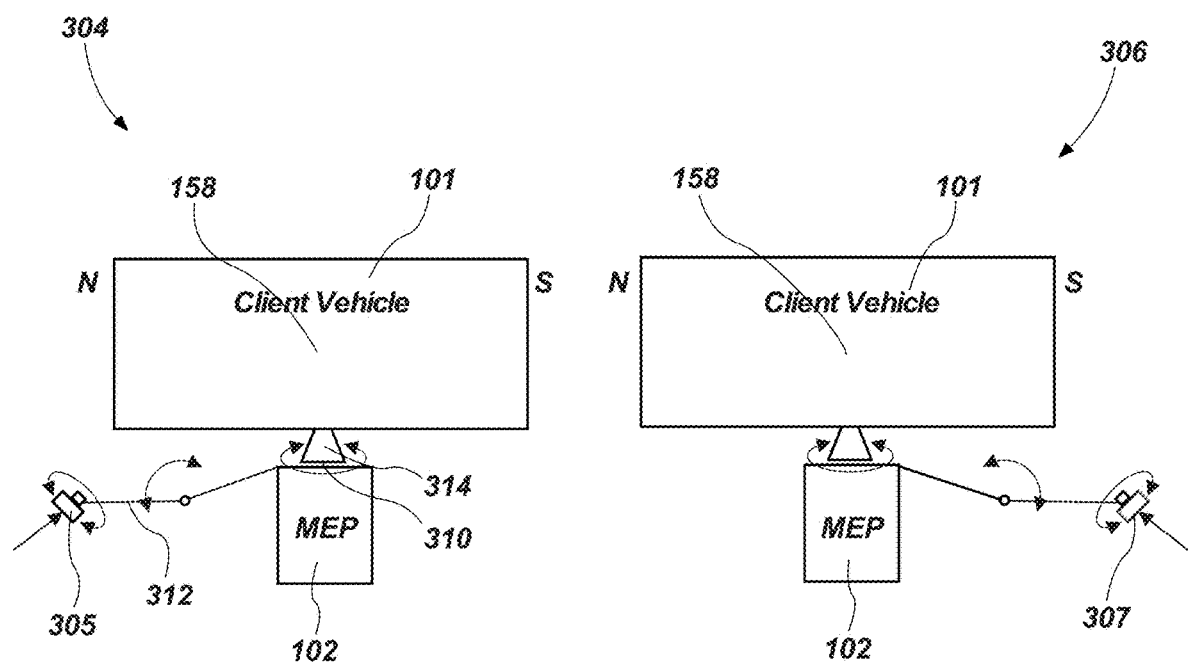
FIG. 5 is another simplified schematic view of a mission extension pod attached to a spacecraft in two thrust vector orientations according to one or more embodiments of the present disclosure.

As shown in the first configuration 300 of the gimbals 204, 205, 230 (e.g., three rotational degrees of freedom) that provide the first thrust vector orientation 301, the thrust force may be applied in a predominately southern direction, or anti-normal to the spacecraft orbital direction. Similarly, as shown in the second configuration 302 of the gimbals 204, 205, 230 that provide the second thrust vector orientation 303, the thrust force may be applied in a predominately northern direction, or normal to the spacecraft orbital direction. As shown in FIG. 4, each configuration may include a component of the thrust vector in the positive or negative direction of the orbital velocity. As shown in FIG. 5, the thrust vector in each configuration (e.g., southward and northward) also has a sizeable component in the orbit radial direction of the spacecraft. Slight variations in the thruster vector and burn duration on command (e.g., from a remote ground station) and/or on a schedule (e.g., a predetermined schedule and/or a schedule actively transmitted to the pod 102) are used to perform station keeping of the spacecraft 20 as well as momentum adjustments, as discussed below. In some embodiments, the thrust vector may be applied at different locations around the spacecraft and at different times in the orbit to optimize the control of the spacecraft orbital elements and management of the spacecraft momentum.

This additional thrust from the pod 102 may reduce the rate of propellant consumption from the spacecraft 20 by, for example, 90% or higher, up to 100% and, thereby, acts to extend the mission life of the spacecraft 20.

Given that thrust cannot generally be provided to entirely eliminate drift of the orbital elements of the spacecraft 20 during a single activation period (i.e., burn), the pod 102 may induce a small directional velocity on the spacecraft 20 in one or more orbital directions (e.g., orbit radial, normal, anti-normal, in-plane) with each thruster activation period and through the combination of multiple activation periods and achieve control of all orbital elements of the spacecraft 20. For example, the pod 102 thrust schedule may be planned for selected intervals over a single orbital revolution (e.g., two twelve hour time periods over a day) and for different orbital revolutions over the period of a week, two weeks, three weeks, one month, or longer. Such a schedule may provide pairing thruster burns and associated gimbal angles that create velocity changes that control some or all orbit elements and adjust spacecraft momentum concurrent with the velocity changes or separate from the velocity changes.

FIG. 5 provides another simplified schematic view of the pod 102 (e.g., rotated 90 degrees from the view in FIG. 4) attached to the spacecraft 20 in a first configuration 304 with first thrust vector orientation 305 and in a second configuration 306 with second thrust vector orientation 307. Referring to FIGS. 3 and 5, the gimbals 204, 205 may provide the two degrees of freedom for pointing the thrust force vectors 305, 307 through the center of mass 158 of the spacecraft 20. As depicted, the pod 102 thrust schedule may be planned for two time periods on twelve hour intervals over a day (or any interval that provides the desired result for the target spacecraft 20). Such a schedule may provide pairing thruster burns 305, 307 that create velocity changes that may cancel each other out or be used to control the eccentricity of the spacecraft orbit.

In some embodiments, a thrusting command and/or schedule may be developed and communicated to the pod 102 in order to provide the desired orbit, position, and/or velocity of the spacecraft 20 based, at least in part, on the characteristics of the spacecraft 20.

In some embodiments, a coupling portion 310 of the pod 102 (e.g., including a docking mechanism, such as the expandable docking mechanism 160 discussed above) may include a movable (e.g., rotatable) joint. For example, the rotatable coupling portion 310 may secure the pod 102 to the target spacecraft 20 (e.g., by wedging against a portion of an engine 314 of the target spacecraft) while enabling the pod 102 to rotate relative to the target spacecraft 20. Such a configuration may enable a degree of freedom of a thruster boom arm 312 (e.g., eliminating the need for a separate movable joint, such as, the third gimbal 230 (FIG. 3)), and eliminating the need for two or more thruster gimbal assemblies.

Figure 6:
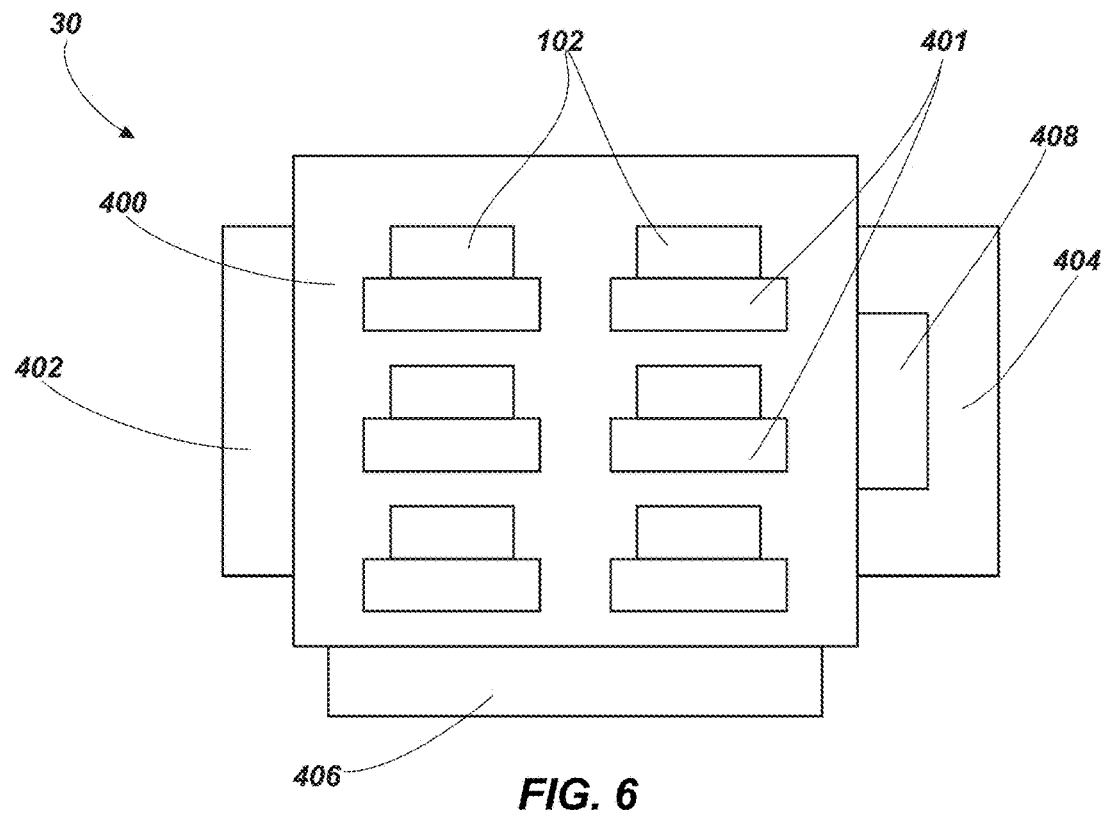
FIG. 6 is a simplified schematic view of a resupply device of a spacecraft servicing system according to one or more embodiments of the present disclosure.

FIG. 6 is a simplified schematic view of a resupply device of a spacecraft servicing system (e.g., the resupply device 30 of the spacecraft servicing system 10 (FIG. 1A)). As shown in FIG. 6, the resupply device 30 may include a number of pods 102 attached to and/or contained within a structure 400 (e.g., an ESPA ring). In some embodiments, each pod 102 may include a respective attachment mechanism 401 for coupling to the structure 400. The structure 400 may include a number of couplings. For example, a first and second coupling 402, 404 for connecting to one of a payload of a launch vehicle and/or the launch vehicle itself. The structure 400 may include a bus 406 comprising one or more spacecraft systems for controlling, monitoring, powering, etc., the resupply device 30. The structure 400 may include a grappling feature 408 configured for coupling with another portion of the system 10 (FIG. 1A) (e.g., the spacecraft servicing device 100 (FIG. 2A)). For example, the grappling feature 408 may comprise a structure to which the robotic arm 122 of the spacecraft servicing device 100 may couple (see FIG. 2A). In some embodiments, the structure of the resupply device 30 may include simulated features (e.g., similarly shaped and/or configured structures) of a separation ring and/or a spacecraft engine so the spacecraft servicing device 100 may dock to it.

Figure 7:
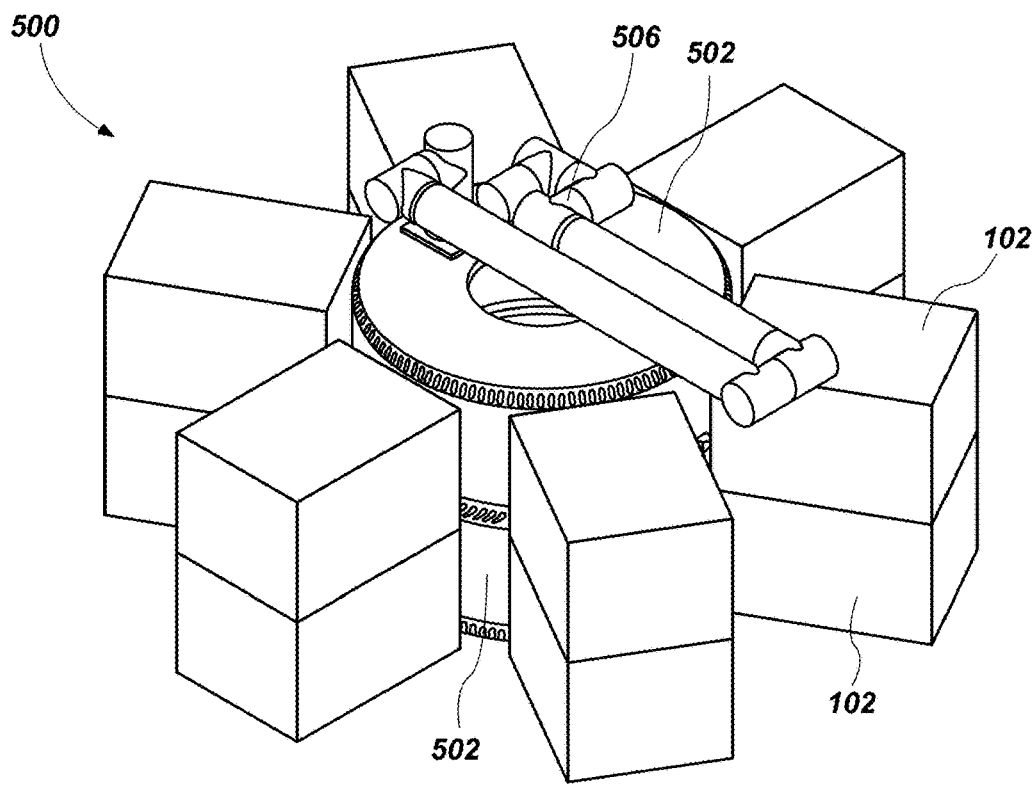
FIGS. 7 through 10 depict various embodiments of spacecraft servicing devices including a number of pods coupled to the spacecraft servicing devices according to one or more embodiments of the present disclosure.

FIGS. 7 through 10 depict various embodiments of spacecraft servicing devices including a number of pods coupled to the spacecraft servicing device according to one or more embodiments of the present disclosure. As shown in FIG. 7, a spacecraft servicing device 500 may be defined by one or more annular structures 502 (e.g., two ESPA rings axially stacked on each other). The pods 102 may be coupled about (e.g., around in a stack of at least two pods 102) the annular structures 502. For example, a pod 102 may be coupled to each port defined around the annual structures 502. A tool (e.g., robotic arm 506) may be coupled to one of the annular structures 502 (e.g., a radially extending surface on one side of the annular structure 502).

Figure 8:
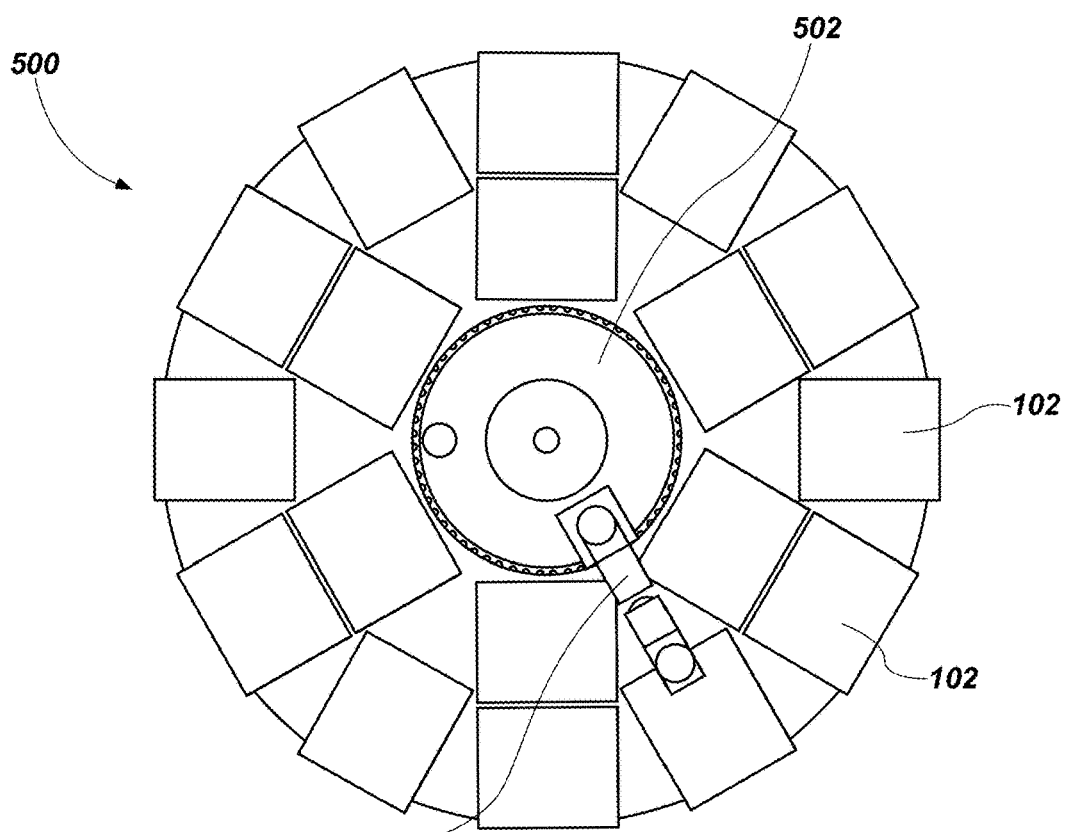

As shown in FIG. 8, the spacecraft servicing device 500 may have a differing configuration of pods 102 coupled about the annular structures 502. For example, pods 102 may be coupled to each port defined around the annual structures 502. A second row of pods 102 may be coupled to a respective pod 102 that is positioned next to (e.g., adjacent and/or coupled to) the annular structure 502. Another set of pods 102 may be positioned (e.g., coupled) in between the sets of two pods 102 extending from the annular structure 502. In some embodiments, a select amount of clearance (e.g., including no clearance) may be provided between the pods 102. In some embodiments, outermost pods 102 may be configured to be positioned within, extend to, or extend beyond, a diameter of a portion of a launch vehicle (e.g., a payload fairing).

Figure 9:
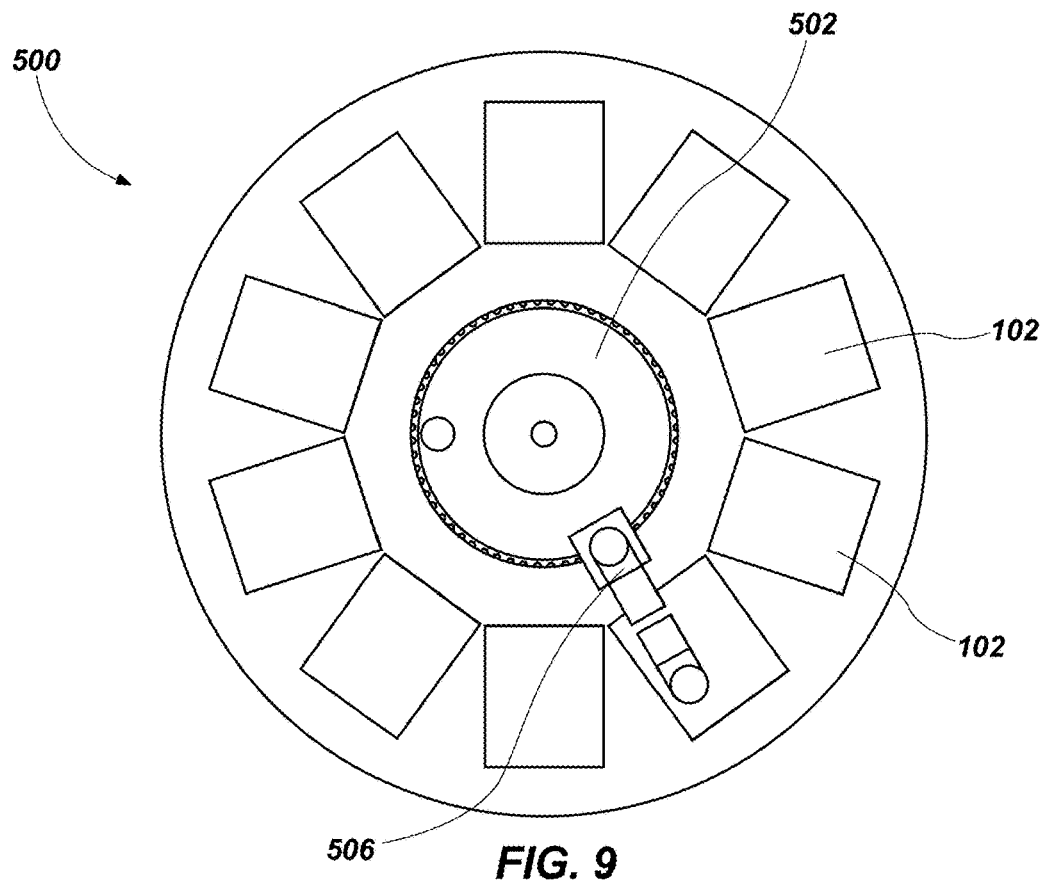

As shown in FIG. 9, the spacecraft servicing device 500 may have a differing configuration of pods 102 coupled about the annular structures 502. For example, pods 102 may be coupled to, but spaced from, each port defined around the annular structures 502. A second row of pods 102 may be positioned adjacent (e.g., coupled to) a respective pod 102 that is positioned next to the annular structure 502. Another set of pods 102 may be positioned (e.g., coupled) in between the sets of two pods 102 extending from the annular structure 502.

Figure 10:
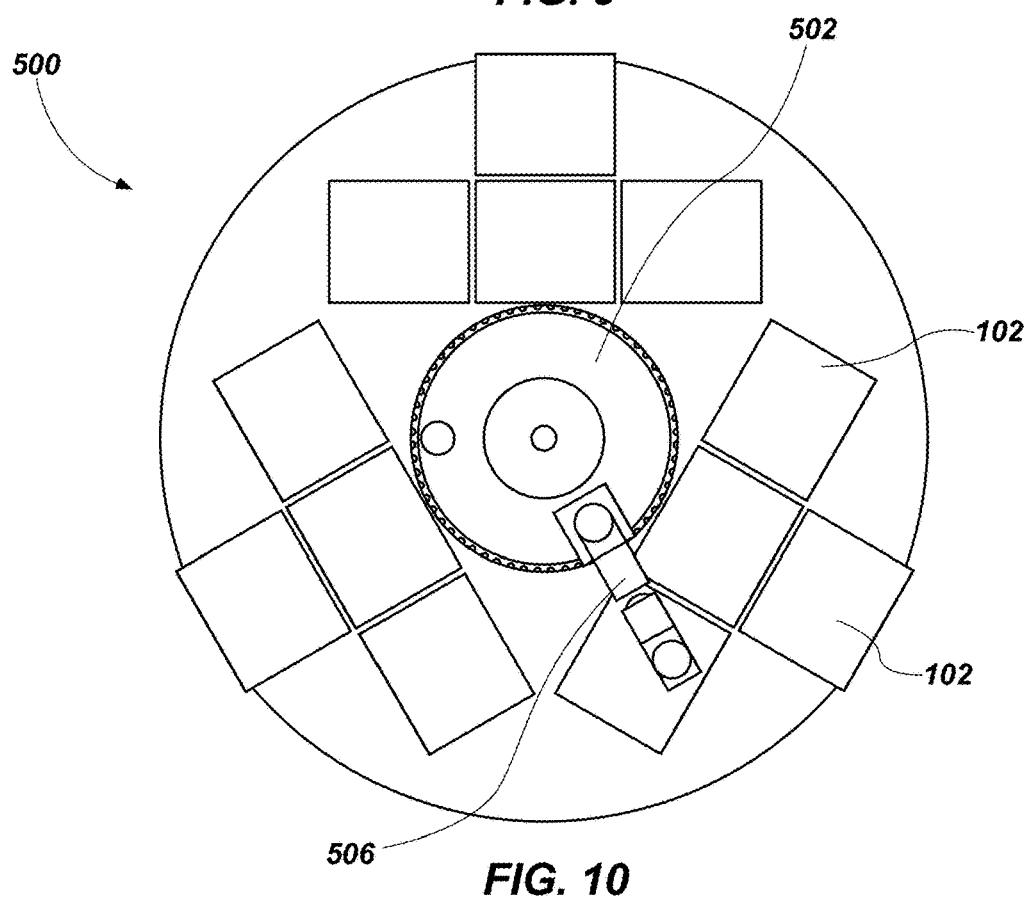

As shown in FIG. 10, the spacecraft servicing device 500 may have a differing configuration of pods 102 coupled about the annular structures 502. For example, a select amount of pods 102 (e.g., three pods 102) may be coupled to each port defined around the annual structures 502. A second row of pods 102 may be positioned adjacent (e.g., coupled to) a respective pod 102 that is positioned next to the annular structure 502. Another set of pods 102 may be positioned (e.g., coupled) on either side of the each respective pod 102 that is positioned next to the annular structure 502.

The embodiments of the disclosure described above and illustrated in the accompanying drawing figures do not limit the scope of the disclosure, since these embodiments are merely examples of embodiments of the disclosure, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A spacecraft servicing system, comprising:
   at least one deployable spacecraft servicing device comprising a propellant tank, the propellant tank configured to store at least one propellant and to be placed into fluid communication with a portion of a target spacecraft, the propellant tank configured to supply at least a portion of the at least one propellant to the target spacecraft during at least one servicing operation on the target spacecraft while being coupled to the target spacecraft, the at least one deployable spacecraft servicing device further comprising a propulsion device for independently moving the at least one deployable spacecraft servicing device and a coupling mechanism configured to couple the at least one deployable spacecraft servicing device to the target spacecraft, the propulsion device being attached to the at least one deployable spacecraft servicing device proximate the coupling mechanism; and
   a host spacecraft comprising:
      a body;
      a propulsion system coupled to the body; and
      a positioning mechanism coupled to the body, the host spacecraft configured to retrieve the at least one deployable spacecraft servicing device with the positioning mechanism and to transfer the at least one deployable spacecraft servicing device to the target spacecraft where the at least one deployable spacecraft servicing device is coupled to the target spacecraft in order to service the target spacecraft, the host spacecraft configured to remain in at least partial physical contact with the at least one deployable spacecraft servicing device until the at least one deployable spacecraft servicing device is coupled to the target spacecraft, the host spacecraft configured to cease physical contact with the at least one deployable spacecraft servicing device after the at least one deployable spacecraft servicing device is coupled to the target spacecraft.

2. The spacecraft servicing system of claim 1, wherein the host spacecraft is configured to retrieve the at least one deployable spacecraft servicing device from a resupply device carrying a plurality of deployable spacecraft servicing devices at a location in space.

3. The spacecraft servicing system of claim 2, wherein the host spacecraft is configured to rendezvous with the resupply device at the location in space and to transfer one or more of the plurality of deployable spacecraft servicing devices carried by the resupply device to the host spacecraft with the positioning mechanism.

4. The spacecraft servicing system of claim 1, wherein the positioning mechanism comprises at least one external movable mechanism configured to deploy the at least one deployable spacecraft servicing device to the target spacecraft.

5. The spacecraft servicing system of claim 4, wherein the at least one external movable mechanism comprises a robotic arm configured to deploy the at least one deployable spacecraft servicing device to the target spacecraft.

6. The spacecraft servicing system of claim 1, wherein the host spacecraft is configured to install the at least one deployable spacecraft servicing device on the target spacecraft using only the propulsion system and the positioning mechanism of the host spacecraft.

7. The spacecraft servicing system of claim 1, wherein the propulsion device of the at least one deployable spacecraft servicing device comprises a thruster assembly positioned on a boom extending outward from the at least one deployable spacecraft servicing device, the thruster assembly and the boom being rotatable about the at least one deployable spacecraft servicing device to maneuver the at least one deployable spacecraft servicing device.

8. The spacecraft servicing system of claim 1, wherein the at least one deployable spacecraft servicing device is configured, when coupled to the target spacecraft, to supply the at least one propellant to the target spacecraft to alter at least one of an orbit or a velocity of the target spacecraft without refueling the target spacecraft.

9. The spacecraft servicing system of claim 1, wherein the propulsion device the at least one deployable spacecraft servicing device comprises a thruster assembly positioned on a boom extending outward from the at least one deployable spacecraft servicing device, the thruster assembly and the boom being rotatable about the at least one deployable spacecraft servicing device to maneuver the at least one deployable spacecraft servicing device, the boom being attached to the at least one deployable spacecraft servicing device at the coupling mechanism.

10. The spacecraft servicing system of claim 1, wherein the coupling mechanism is configured to modify the target spacecraft in order to place the propellant tank in fluid communication with a propulsion device of the target spacecraft.

11. The spacecraft servicing system of claim 1, wherein the host spacecraft is configured to retrieve, transport, and deploy a plurality of deployable spacecraft servicing devices to at least one of a plurality of target spacecraft at one or more selected orbits in space.

12. The spacecraft servicing system of claim 1, wherein the host spacecraft is configured to retrieve and/or refuel the at least one deployable spacecraft servicing device from the target spacecraft.

13. A spacecraft servicing system, comprising:
   a host spacecraft; and
   at least one spacecraft servicing device comprising a propellant tank, the propellant tank configured to store at least one propellant and to be placed into fluid communication with a portion of a target spacecraft, the propellant tank configured to supply at least a portion of the at least one propellant to the target spacecraft during at least one servicing operation on the target spacecraft while being coupled to the target spacecraft with a coupling device, the host spacecraft configured to retrieve the at least one spacecraft servicing device from a selected orbit in space and allocate the at least one spacecraft servicing device to a target spacecraft in order to supply the target spacecraft with the at least a portion of the at least one propellant of the propellant tanks of the at least one spacecraft servicing device, the at least one spacecraft servicing device further comprising a propulsion device for maneuvering the at least one spacecraft servicing device, the propulsion device being coupled to a body of the at least one spacecraft servicing device proximate the coupling device.

14. The spacecraft servicing system of claim 13, further comprising a resupply spacecraft, the host spacecraft configured to retrieve the at least one spacecraft servicing device from the resupply spacecraft at the selected orbit in space.

15. The spacecraft servicing system of claim 13, wherein the host spacecraft is configured to position the at least one spacecraft servicing device at a position in proximity to the target spacecraft, and wherein the at least one spacecraft servicing device comprises a coupling mechanism configured to engage with the target spacecraft at the position in proximity to the target spacecraft in order to secure the at least one spacecraft servicing device to the target spacecraft.

16. The spacecraft servicing system of claim 13, wherein the host spacecraft configured to retrieve the at least one spacecraft servicing device from another spacecraft at the selected orbit in space.

17. The spacecraft servicing system of claim 13, wherein the host spacecraft comprises a retrieval mechanism, the retrieval mechanism configured to engage and secure the at least one spacecraft servicing device in space for transport and to deploy the at least one spacecraft servicing device at the target spacecraft.

18. A method of supplying a propellant to a target spacecraft with a spacecraft servicing device, the method comprising:
- retrieving one or more deployable spacecraft servicing devices comprising at least one spacecraft servicing component from an orbit in space with a host spacecraft;
- coupling the one or more deployable spacecraft servicing devices to the target spacecraft;
- ceasing physical contact between with the host spacecraft and the one or more deployable spacecraft servicing devices after the one or more deployable spacecraft servicing devices are coupled to the target spacecraft;
- using a portion of a propellant from a propellant tank of the one or more deployable spacecraft servicing devices to maneuver the one or more deployable spacecraft servicing devices with a propulsion system of the one or more deployable spacecraft servicing devices; and
- supplying another portion of the propellant from the propellant tank of the one or more deployable spacecraft servicing devices to a propulsion system of the target spacecraft via fluid channels of the propulsion system.

19. The method of claim 18, further comprising transporting the one or more deployable spacecraft servicing devices from the orbit in space to the target spacecraft with the host spacecraft.

20. The method of claim 18, further comprising retrieving the one or more deployable spacecraft servicing devices with the host spacecraft from a resupply device at the orbit in space.

* * * * *